US011910180B2

(12) United States Patent
Armstrong et al.

(10) Patent No.: US 11,910,180 B2
(45) **Date of Patent: *Feb. 20, 2024**

(54) AUDIO PROCESSING METHOD AND APPARATUS

(71) Applicant: Huawei Technologies Co., Ltd., Shenzhen (CN)

(72) Inventors: Cal Armstrong, York (GB); Gavin Kearney, York (GB); Bin Wang, Shenzhen (CN); Zexin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,542

(22) Filed: Feb. 23, 2023

(65) Prior Publication Data

US 2023/0199424 A1 Jun. 22, 2023

Related U.S. Application Data

(63) Continuation of application No. 17/179,723, filed on Feb. 19, 2021, now Pat. No. 11,611,841, which is a (Continued)

(30) Foreign Application Priority Data

Aug. 20, 2018 (CN) ......................... 201810950088.1

(51) Int. Cl.

| | |
|---|---|
| ***H04S 7/00*** | (2006.01) |
| ***H04S 5/00*** | (2006.01) |
| ***H04S 3/00*** | (2006.01) |

(52) U.S. Cl.

CPC .......... *H04S 7/303* (2013.01); *H04S 2400/01* (2013.01); *H04S 2420/01* (2013.01)

(58) Field of Classification Search

None

See application file for complete search history.

(56) References Cited

U.S. PATENT DOCUMENTS

| | | | |
|---|---|---|---|
| 10,492,018 | B1 | 11/2019 | Allen |
| 10,750,307 | B2 | 8/2020 | Liu et al. |

(Continued)

FOREIGN PATENT DOCUMENTS

| | | | |
|---|---|---|---|
| CN | 1728890 | A | 2/2006 |
| CN | 1860826 | A | 11/2006 |

(Continued)

OTHER PUBLICATIONS

Xie Bosun et al., A Simplified Way to Simulate 3D Virtual Sound Image. Audio Engineering, No. 7, 2001, 5 pages.

(Continued)

*Primary Examiner* — Qin Zhu

(74) *Attorney, Agent, or Firm* — Conley Rose, P.C.

(57) ABSTRACT

An audio processing method includes processing, by M first virtual speakers, a to-be-processed audio signal to obtain M first audio signals; processing, by N second virtual speakers, the to-be-processed audio signal to obtain N second audio signals; obtain M first head-related transfer functions (HRTFs) centered at a left ear position and N second HRTFs centered at a right ear position; obtain a first target audio signal based on the M first audio signals and the M first HRTFs; and obtain a second target audio signal based on the N second audio signals and the N second HRTFs.

20 Claims, 12 Drawing Sheets

Related U.S. Application Data continuation of application No. PCT/CN2019/078781, filed on Mar. 19, 2019.

(56) References Cited

U.S. PATENT DOCUMENTS

| | | | | |
|---|---|---|---|---|
| 2005/0047618 | A1 | 3/2005 | Davis et al. | |
| 2005/0100171 | A1 | 5/2005 | Reilly et al. | |
| 2005/0271213 | A1 | 12/2005 | Kim | |
| 2006/0023889 | A1 | 2/2006 | Suzaki et al. | |
| 2006/0083394 | A1 | 4/2006 | McGrath | |
| 2007/0154020 | A1* | 7/2007 | Katayama | H04S 1/002 381/17 |
| 2010/0054483 | A1 | 3/2010 | Mizuno | |
| 2013/0194107 | A1* | 8/2013 | Nagata | G08G 1/166 340/904 |
| 2014/0286511 | A1* | 9/2014 | Nakano | H04R 5/02 381/300 |
| 2015/0245157 | A1 | 8/2015 | Seefeldt | |
| 2016/0012816 | A1 | 1/2016 | Fujisawa | |
| 2016/0100270 | A1 | 4/2016 | Araki | |
| 2016/0241980 | A1 | 8/2016 | Najaf-Zadeh et al. | |
| 2016/0241986 | A1 | 8/2016 | Lang et al. | |
| 2017/0078821 | A1 | 3/2017 | Faller et al. | |
| 2017/0272890 | A1 | 9/2017 | Oh et al. | |
| 2018/0132054 | A1 | 5/2018 | Jin et al. | |
| 2018/0279065 | A1 | 9/2018 | Celestinos et al. | |
| 2019/0174248 | A1 | 6/2019 | Nakano | |
| 2020/0037097 | A1 | 1/2020 | Torres et al. | |
| 2020/0267486 | A1 | 8/2020 | Liu | |
| 2021/0067891 | A1 | 3/2021 | Anagnos | |
| 2021/0168548 | A1 | 6/2021 | Honma et al. | |

FOREIGN PATENT DOCUMENTS

| | | | |
|---|---|---|---|
| CN | 101529930 | A | 9/2009 |
| CN | 104581610 | A | 4/2015 |
| CN | 105933835 | A | 9/2016 |
| CN | 106664499 | A | 5/2017 |
| CN | 107105384 | A | 8/2017 |
| CN | 107113524 | A | 8/2017 |
| CN | 107182021 | A | 9/2017 |
| CN | 107786936 | A | 3/2018 |
| CN | 107925814 | A | 4/2018 |
| CN | 108156575 | A | 6/2018 |
| EP | 3046339 | A1 | 7/2016 |
| KR | 100312965 | B1 | 6/2001 |
| WO | 2010020788 | A1 | 2/2010 |
| WO | 2014035728 | A2 | 3/2014 |
| WO | 2018036194 | A1 | 3/2018 |

OTHER PUBLICATIONS

Armstrong, C., et al., "A Bi-RADIAL Approach to Ambisonics," Audio Engineering Society, Presented at the Conference on Audio for Virtual and Augmented Reality, Aug. 20-22, 2018, Redmond, WA, USA, 10 pages.

* cited by examiner

AUDIO PROCESSING METHOD AND APPARATUS

CROSS-REFERENCE TO RELATED APPLICATIONS

This application is a continuation of U.S. patent application Ser. No. 17/179,723, filed on Feb. 19, 2021, which is a continuation of International Patent Application No. PCT/CN2019/078781, filed on Mar. 19, 2019, which claims priority to Chinese Patent Application No. 201810950088.1, filed on Aug. 20, 2018. All of the aforementioned patent applications are hereby incorporated by reference in their entireties.

TECHNICAL FIELD

The present disclosure relates to sound processing technologies, and in particular to an audio processing method and apparatus.

BACKGROUND

With the rapid development of high-performance computers and signal processing technologies, a virtual reality technology has attracted growing attention. An immersive virtual reality system requires not only a stunning visual effect but also a realistic auditory effect. Audio-visual fusion can greatly improve experience of virtual reality. A core of virtual reality audio is a three-dimensional audio technology. Currently, there are a plurality of playback methods (for example, a multi-channel-based method and an object-based method) for implementing three-dimensional audio. However, on an existing virtual reality device, binaural playback based on a multi-channel headset is most commonly used.

The binaural playback based on a multi-channel headset is mainly implemented using a head-related transfer function (HRTF). The HRTF indicates impact of scattering, reflection, and refraction of the head, the trunk, and an auricle during transmission of a sound wave generated by a sound source to an ear canal. When it is assumed that the sound source is at a position, an audio signal receive end convolves a corresponding HRTF from the position to a head center position of a listener with an audio signal sent by the sound source. A sweet spot of an obtained processed audio signal is the head center position of the listener. In other words, the processed audio signal that is transmitted to the head center position of the listener is an optimal audio signal.

However, positions of two ears of the listener are not equivalent to the head center position of the listener. Therefore, the foregoing obtained processed audio signal that is transmitted to the two ears of the listener is not an optimal audio signal. In other words, quality of an audio signal output by the audio signal receive end is not high.

SUMMARY

Embodiments of the present disclosure provide an audio processing method and apparatus, to improve quality of an audio signal output by an audio signal receive end.

According to a first aspect, an embodiment of the present disclosure provides an audio processing method, including: obtaining M first audio signals by processing a to-be-processed audio signal by M first virtual speakers, and N second audio signals by processing the to-be-processed audio signal by N second virtual speakers, where the M first virtual speakers are in a one-to-one correspondence with the M first audio signals, the N second virtual speakers are in a one-to-one correspondence with the N second audio signals, and M and N are positive integers; obtaining M first HRTFs and N second HRTFs, where all the M first HRTFs are centered at a left ear position, all the N second HRTFs are centered at a right ear position, the M first HRTFs are in a one-to-one correspondence with the M first virtual speakers, and the N second HRTFs are in a one-to-one correspondence with the N second virtual speakers; and obtaining a first target audio signal based on the M first audio signals and the M first HRTFs, and obtaining a second target audio signal based on the N second audio signals and the N second HRTFs.

In the solution, the first target audio signal that is transmitted to the left ear is obtained based on the M first audio signals and the M first HRTFs that are centered at the left ear position, such that a signal that is transmitted to the left ear position is optimal. In addition, the second target audio signal that is transmitted to the right ear is obtained based on the N second audio signals and the N second HRTFs that are centered at the right ear position, such that a signal that is transmitted to the right ear position is optimal. Therefore, quality of an audio signal output by an audio signal receive end is improved.

Optionally, the obtaining a first target audio signal based on the M first audio signals and the M first HRTFs in the foregoing solution includes: convolving each of the M first audio signals with a corresponding first HRTF, to obtain M first convolved audio signals; and obtaining the first target audio signal based on the M first convolved audio signals.

Optionally, the obtaining a second target audio signal based on the N second audio signals and the N second HRTFs in the foregoing solution includes: convolving each of the N second audio signals with a corresponding second HRTF, to obtain N second convolved audio signals; and obtaining the second target audio signal based on the N second convolved audio signals.

For example, the obtaining M first HRTFs may be performed in the following several implementations.

In an implementation, correspondences between a plurality of preset positions and a plurality of HRTFs are prestored, and the obtaining M first HRTFs includes: obtaining M first positions of the M first virtual speakers relative to the current left ear position; and determining, based on the M first positions and the correspondences, that M HRTFs corresponding to the M first positions are the M first HRTFs.

In this implementation, the obtained M first HRTFs corresponding to the M virtual speakers are M HRTFs that are centered at the left ear position and that are obtained through actual measurement. The M first HRTFs can best represent HRTFs to which the M first audio signals correspond when the M first audio signals are transmitted to the current left ear position. In this way, a signal that is transmitted to the left ear position is optimal.

In another implementation, correspondences between a plurality of preset positions and a plurality of HRTFs are prestored, and the obtaining N second HRTFs includes: obtaining N second positions of the N second virtual speakers relative to the current right ear position; and determining, based on the N second positions and the correspondences, that N HRTFs corresponding to the N second positions are the N second HRTFs.

In this implementation, the M first HRTFs are converted from HRTFs centered at a head center, and efficiency of obtaining the first HRTFs is comparatively high.

In another implementation, correspondences between a plurality of preset positions and a plurality of HRTFs are prestored, and the obtaining M first HRTFs includes: obtaining M third positions of the M first virtual speakers relative to a current head center, where the third position includes a first azimuth and a first elevation of the first virtual speaker relative to the current head center, and includes a first distance between the current head center and the first virtual speaker; determining M fourth positions based on the M third positions, where the M third positions are in a one-to-one correspondence with the M fourth positions, one fourth position and a corresponding third position include a same elevation and a same distance, and a difference between an azimuth included in the one fourth position and a first value is a first azimuth included in the corresponding third position; and the first value is a difference between a first included angle and a second included angle, the first included angle is an included angle between a first straight line and a first plane, the second included angle is an included angle between a second straight line and the first plane, the first straight line is a straight line that passes through the current left ear and a coordinate origin of a three-dimensional coordinate system, the second straight line is a straight line that passes through the current head center and the coordinate origin, and the first plane is a plane constituted by an X axis and a Z axis of the three-dimensional coordinate system; and determining, based on the M fourth positions and the correspondences, that M HRTFs corresponding to the M fourth positions are the M first HRTFs.

In this embodiment, the M first HRTFs are converted from HRTFs centered at the head center, and during obtaining of the fourth positions, a size of the head of a current listener is not considered. This further improves efficiency of obtaining the first HRTFs.

For example, the obtaining N second HRTFs may be performed in the following several implementations.

In another implementation, correspondences between a plurality of preset positions and a plurality of HRTFs are prestored, and the obtaining N second HRTFs includes: obtaining N fifth positions of the N second virtual speakers relative to the current head center, where the fifth position includes a second azimuth and a second elevation of the second virtual speaker relative to the current head center, and includes a second distance between the current head center and the second virtual speaker; determining N sixth positions based on the N fifth positions, where the N fifth positions are in a one-to-one correspondence with the N sixth positions, one sixth position and a corresponding fifth position include a same elevation and a same distance, and a sum of an azimuth included in the one sixth position and a second value is a second azimuth included in the corresponding fifth position; and the second value is a difference between a third included angle and a second included angle, the second included angle is an included angle between a second straight line and a first plane, the third included angle is an included angle between a third straight line and the first plane, the second straight line is the straight line that passes through the current head center and the coordinate origin, the third straight line is a straight line that passes through the current right ear and the coordinate origin, and the first plane is the plane constituted by the X axis and the Z axis of the three-dimensional coordinate system; and determining, based on the N sixth positions and the correspondences, that N HRTFs corresponding to the N sixth positions are the N second HRTFs.

In this implementation, the N second HRTFs are N HRTFs that are centered at the right ear position and that are obtained through actual measurement. The obtained N second HRTFs can best represent HRTFs to which the N second audio signals correspond when the N second audio signals are transmitted to the current right ear position of the listener. In this way, a signal that is transmitted to the right ear position is optimal.

In another implementation, correspondences between a plurality of preset positions and a plurality of HRTFs are prestored, and the obtaining M first HRTFs includes: obtaining M third positions of the M first virtual speakers relative to a current head center, where the third position includes a first azimuth and a first elevation of the first virtual speaker relative to the current head center, and includes a first distance between the current head center and the first virtual speaker; determining M seventh positions based on the M third positions, where the M third positions are in a one-to-one correspondence with the M seventh positions, one seventh position and a corresponding third position include a same elevation and a same distance, and a difference between an azimuth included in the one seventh position and a first preset value is a first azimuth included in the corresponding third position; and determining, based on the M seventh positions and the correspondences, that M HRTFs corresponding to the M seventh positions are the M first HRTFs.

In this implementation, the N second HRTFs are converted from HRTFs centered at the head center, and efficiency of obtaining the second HRTFs is comparatively high.

In another implementation, correspondences between a plurality of preset positions and a plurality of HRTFs are prestored, and the obtaining N second HRTFs includes: obtaining N fifth positions of the N second virtual speakers relative to the current head center, where the fifth position includes a second azimuth and a second elevation of the second virtual speaker relative to the current head center, and includes a second distance between the current head center and the second virtual speaker; determining N eighth positions based on the N fifth positions, where the N fifth positions are in a one-to-one correspondence with the N eighth positions, one eighth position and a corresponding fifth position include a same elevation and a same distance, and a sum of an azimuth included in the one eighth position and the first preset value is a second azimuth included in the corresponding fifth position; and determining, based on the N eighth positions and the correspondences, that N HRTFs corresponding to the N eighth positions are the N second HRTFs.

In this implementation, the N second HRTFs are converted from HRTFs centered at the head center, and during obtaining of the eighth positions, a size of the head of the current listener is not considered. This further improves efficiency of obtaining the second HRTFs.

In a possible design, before the obtaining M first audio signals by processing a to-be-processed audio signal by M first virtual speakers, the method further includes: obtaining a target virtual speaker group, where the target virtual speaker group includes M target virtual speakers, and the M target virtual speakers are in a one-to-one correspondence with the M first virtual speakers; and determining M tenth positions of the M first virtual speakers relative to the coordinate origin of the three-dimensional coordinate system based on M ninth positions of the M target virtual speakers relative to the coordinate origin, where the M ninth positions are in a one-to-one correspondence with the M tenth positions, one tenth position and a corresponding ninth position include a same elevation and a same distance, and a difference between an azimuth included in the one tenth position and a second preset value is an azimuth included in the corresponding ninth position.

The obtaining M first audio signals by processing a to-be-processed audio signal by M first virtual speakers includes: processing the to-be-processed audio signal based on the M tenth positions, to obtain the M first audio signals.

In this implementation, one target virtual speaker group is virtually placed, the M first virtual speakers corresponding to the left ear are converted from the target virtual speaker group. In this way, overall efficiency of placing the virtual speakers is high.

In a possible design, M=N, and before the obtaining N second audio signals by processing the to-be-processed audio signal by N second virtual speakers, the method further includes: obtaining a target virtual speaker group, where the target virtual speaker group includes M target virtual speakers, and the M target virtual speakers are in a one-to-one correspondence with the N second virtual speakers; and determining N eleventh positions of the N second virtual speakers relative to the coordinate origin of the three-dimensional coordinate system based on the M ninth positions of the M target virtual speakers relative to the coordinate origin, where the M ninth positions are in a one-to-one correspondence with the N eleventh positions, one eleventh position and a corresponding ninth position include a same elevation and a same distance, and a sum of an azimuth included in the one eleventh position and a second preset value is an azimuth included in the corresponding ninth position.

The obtaining N second audio signals by processing the to-be-processed audio signal by N second virtual speakers includes: processing the to-be-processed audio signal based on the N eleventh positions, to obtain the N second audio signals.

In this implementation, one target virtual speaker group is placed, the N second virtual speakers corresponding to the right ear are converted from the target virtual speaker group. In this way, overall efficiency of placing the virtual speakers is high.

In a possible design, the M first virtual speakers are speakers in a first speaker group, the N second virtual speakers are speakers in a second speaker group, and the first speaker group and the second speaker group are two independent speaker groups; or the M first virtual speakers are speakers in a first speaker group, the N second virtual speakers are speakers in a second speaker group, and the first speaker group and the second speaker group are a same speaker group, where M=N.

According to a second aspect, an embodiment of the present disclosure provides an audio processing apparatus, including: a processing module configured to obtain M first audio signals by processing a to-be-processed audio signal by M first virtual speakers, and N second audio signals by processing the to-be-processed audio signal by N second virtual speakers, where the M first virtual speakers are in a one-to-one correspondence with the M first audio signals, the N second virtual speakers are in a one-to-one correspondence with the N second audio signals, and M and N are positive integers; and an obtaining module configured to obtain M first HRTFs and N second HRTFs, where all the M first HRTFs are centered at a left ear position, all the N second HRTFs are centered at a right ear position, the M first HRTFs are in a one-to-one correspondence with the M first virtual speakers, and the N second HRTFs are in a one-to-one correspondence with the N second virtual speakers.

The obtaining module is further configured to: obtain a first target audio signal based on the M first audio signals and the M first HRTFs, and obtain a second target audio signal based on the N second audio signals and the N second HRTFs.

In a possible design, the obtaining module is configured to: convolve each of the M first audio signals with a corresponding first HRTF, to obtain M first convolved audio signals; and obtain the first target audio signal based on the M first convolved audio signals.

In a possible design, the obtaining module is configured to: convolve each of the N second audio signals with a corresponding second HRTF, to obtain N second convolved audio signals; and obtain the second target audio signal based on the N second convolved audio signals.

In a possible design, the obtaining module is configured to: obtain M first positions of the M first virtual speakers relative to the current left ear position; and determine, based on the M first positions and correspondences, that M HRTFs corresponding to the M first positions are the M first HRTFs, where the correspondences are prestored correspondences between a plurality of preset positions and a plurality of HRTFs.

In a possible design, the obtaining module is configured to: obtain N second positions of the N second virtual speakers relative to the current right ear position; and determine, based on the N second positions and correspondences, that N HRTFs corresponding to the N second positions are the N second HRTFs, where the correspondences are prestored correspondences between a plurality of preset positions and a plurality of HRTFs.

In a possible design, the obtaining module is configured to: obtain M third positions of the M first virtual speakers relative to a current head center, where the third position includes a first azimuth and a first elevation of the first virtual speaker relative to the current head center, and includes a first distance between the current head center and the first virtual speaker; determine M fourth positions based on the M third positions, where the M third positions are in a one-to-one correspondence with the M fourth positions, one fourth position and a corresponding third position include a same elevation and a same distance, and a difference between an azimuth included in the one fourth position and a first value is a first azimuth included in the corresponding third position; and the first value is a difference between a first included angle and a second included angle, the first included angle is an included angle between a first straight line and a first plane, the second included angle is an included angle between a second straight line and the first plane, the first straight line is a straight line that passes through the current left ear and a coordinate origin of a three-dimensional coordinate system, the second straight line is a straight line that passes through the current head center and the coordinate origin, and the first plane is a plane constituted by an X axis and a Z axis of the three-dimensional coordinate system; and determine, based on the M fourth positions and correspondences, that M HRTFs corresponding to the M fourth positions are the M first HRTFs, where the correspondences are prestored correspondences between a plurality of preset positions and a plurality of HRTFs.

In a possible design, correspondences between a plurality of preset positions and a plurality of HRTFs are prestored, and the obtaining module is configured to: obtain N fifth positions of the N second virtual speakers relative to the current head center, where the fifth position includes a second azimuth and a second elevation of the second virtual speaker relative to the current head center, and includes a second distance between the current head center and the second virtual speaker; determine N sixth positions based on the N fifth positions, where the N fifth positions are in a one-to-one correspondence with the N sixth positions, one sixth position and a corresponding fifth position include a same elevation and a same distance, and a sum of an azimuth included in the one sixth position and a second value is a second azimuth included in the corresponding fifth position; and the second value is a difference between a third included angle and a second included angle, the second included angle is an included angle between a second straight line and a first plane, the third included angle is an included angle between a third straight line and the first plane, the second straight line is the straight line that passes through the current head center and the coordinate origin, the third straight line is a straight line that passes through the current right ear and the coordinate origin, and the first plane is the plane constituted by the X axis and the Z axis of the three-dimensional coordinate system; and determine, based on the N sixth positions and correspondences, that N HRTFs corresponding to the N sixth positions are the N second HRTFs, where the correspondences are prestored correspondences between a plurality of preset positions and a plurality of HRTFs.

In a possible design, correspondences between a plurality of preset positions and a plurality of HRTFs are prestored, and the obtaining module is configured to: obtain M third positions of the M first virtual speakers relative to a current head center, where the third position includes a first azimuth and a first elevation of the first virtual speaker relative to the current head center, and includes a first distance between the current head center and the first virtual speaker; determine M seventh positions based on the M third positions, where the M third positions are in a one-to-one correspondence with the M seventh positions, one seventh position and a corresponding third position include a same elevation and a same distance, and a difference between an azimuth included in the one seventh position and a first preset value is a first azimuth included in the corresponding third position; and determine, based on the M seventh positions and correspondences, that M HRTFs corresponding to the M seventh positions are the M first HRTFs, where the correspondences are prestored correspondences between a plurality of preset positions and a plurality of HRTFs.

In a possible design, correspondences between a plurality of preset positions and a plurality of HRTFs are prestored, and the obtaining module is configured to: obtain N fifth positions of the N second virtual speakers relative to the current head center, where the fifth position includes a second azimuth and a second elevation of the second virtual speaker relative to the current head center, and includes a second distance between the current head center and the second virtual speaker; determine N eighth positions based on the N fifth positions, where the N fifth positions are in a one-to-one correspondence with the N eighth positions, one eighth position and a corresponding fifth position include a same elevation and a same distance, and a sum of an azimuth included in the one eighth position and the first preset value is a second azimuth included in the corresponding fifth position; and determine, based on the N eighth positions and correspondences, that N HRTFs corresponding to the N eighth positions are the N second HRTFs, where the correspondences are prestored correspondences between a plurality of preset positions and a plurality of HRTFs.

In a possible design, before the M first audio signals are obtained by processing the to-be-processed audio signal by the M first virtual speakers, the obtaining module is further configured to: obtain a target virtual speaker group, where the target virtual speaker group includes M target virtual speakers, and the M target virtual speakers are in a one-to-one correspondence with the M first virtual speakers; and determine M tenth positions of the M first virtual speakers relative to the coordinate origin of the three-dimensional coordinate system based on M ninth positions of the M target virtual speakers relative to the coordinate origin, where the M ninth positions are in a one-to-one correspondence with the M tenth positions, one tenth position and a corresponding ninth position include a same elevation and a same distance, and a difference between an azimuth included in the one tenth position and a second preset value is an azimuth included in the corresponding ninth position.

The processing module is configured to process the to-be-processed audio signal based on the M tenth positions, to obtain the M first audio signals.

In a possible design, M=N, and before the N second audio signals are obtained by processing the to-be-processed audio signal by the N second virtual speakers, the obtaining module is further configured to: obtain a target virtual speaker group, where the target virtual speaker group includes M target virtual speakers, and the M target virtual speakers are in a one-to-one correspondence with the N second virtual speakers; and determine N eleventh positions of the N second virtual speakers relative to the coordinate origin of the three-dimensional coordinate system based on the M ninth positions of the M target virtual speakers relative to the coordinate origin, where the M ninth positions are in a one-to-one correspondence with the N eleventh positions, one eleventh position and a corresponding ninth position include a same elevation and a same distance, and a sum of an azimuth included in the one eleventh position and a second preset value is an azimuth included in the corresponding ninth position.

The processing module is configured to process the to-be-processed audio signal based on the N eleventh positions, to obtain the N second audio signals.

In a possible design, the M first virtual speakers are speakers in a first speaker group, the N second virtual speakers are speakers in a second speaker group, and the first speaker group and the second speaker group are two independent speaker groups; or the M first virtual speakers are speakers in a first speaker group, the N second virtual speakers are speakers in a second speaker group, and the first speaker group and the second speaker group are a same speaker group, where M=N.

According to a third aspect, an embodiment of the present disclosure provides an audio processing apparatus, including a processor.

The processor is configured to: be coupled to a memory, and read and execute an instruction in the memory, to implement the method according to any one of the possible designs of the first aspect.

In a possible design, the memory is further included.

According to a fourth aspect, an embodiment of the present disclosure provides a readable storage medium. The readable storage medium stores a computer program, and when the computer program is executed, the method according to any one of the possible designs of the first aspect is implemented.

According to a fifth aspect, an embodiment of the present disclosure provides a computer program product. When the computer program is executed, the method according to any one of the possible designs of the first aspect is implemented.

In the present disclosure, the first target audio signal that is transmitted to the left ear is obtained based on the M first audio signals and the M first HRTFs centered at the left ear position, such that a signal that is transmitted to the left ear position is optimal. In addition, the second target audio signal that is transmitted to the right ear is obtained based on the N second audio signals and the N second HRTFs centered at the right ear position, such that a signal that is transmitted to the right ear position is optimal. Therefore, quality of an audio signal output by the audio signal receive end is improved.

DESCRIPTION OF EMBODIMENTS

Related technical terms in the present disclosure are first explained.

Head-related transfer function (HRTF): A sound wave sent by a sound source reaches two ears after being scattered by the head, an auricle, the trunk, and the like. A physical process of transmitting the sound wave from the sound source to the two ears may be considered as a linear time-invariant acoustic filtering system, and features of the process may be described using the HRTF. In other words, the HRTF describes the process of transmitting the sound wave from the sound source to the two ears. A more vivid explanation is as follows: If an audio signal sent by the sound source is X, and a corresponding audio signal after the audio signal X is transmitted to a preset position is Y, $X*Z=Y$ (convolution of X and Z is equal to Y), where Z is the HRTF.

In the embodiments, a preset position in correspondences between a plurality of preset positions and a plurality of HRTFs may be a position relative to a left ear position. In this case, the plurality of HRTFs are a plurality of HRTFs centered at the left ear position. Alternatively, in the embodiments, a preset position in correspondences between a plurality of preset positions and a plurality of HRTFs may be a position relative to a right ear position. In this case, the plurality of HRTFs are a plurality of HRTFs centered at the right ear position. Alternatively, in the embodiments, a preset position in correspondences between a plurality of preset positions and a plurality of HRTFs may be a position relative to a head center position. In this case, the plurality of HRTFs are a plurality of HRTFs centered at the head center.

Figure 1:
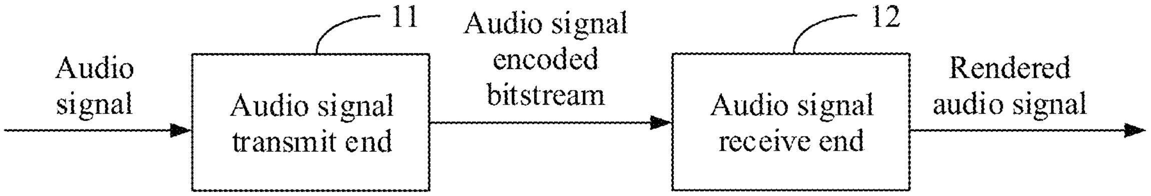
FIG. 1 is a schematic structural diagram of an audio signal system according to an embodiment of the present disclosure.

FIG. 1 is a schematic structural diagram of an audio signal system according to an embodiment of the present disclosure. The audio signal system includes an audio signal transmit end 11 and an audio signal receive end 12.

The audio signal transmit end 11 is configured to collect and encode a signal sent by a sound source, to obtain an audio signal encoded bitstream. After obtaining the audio signal encoded bitstream, the audio signal receive end 12 decodes the audio signal encoded bitstream, to obtain a decoded audio signal; and then renders the decoded audio signal to obtain a rendered audio signal.

Optionally, the audio signal transmit end 11 may be connected to the audio signal receive end 12 in a wired or wireless manner.

Figure 2:
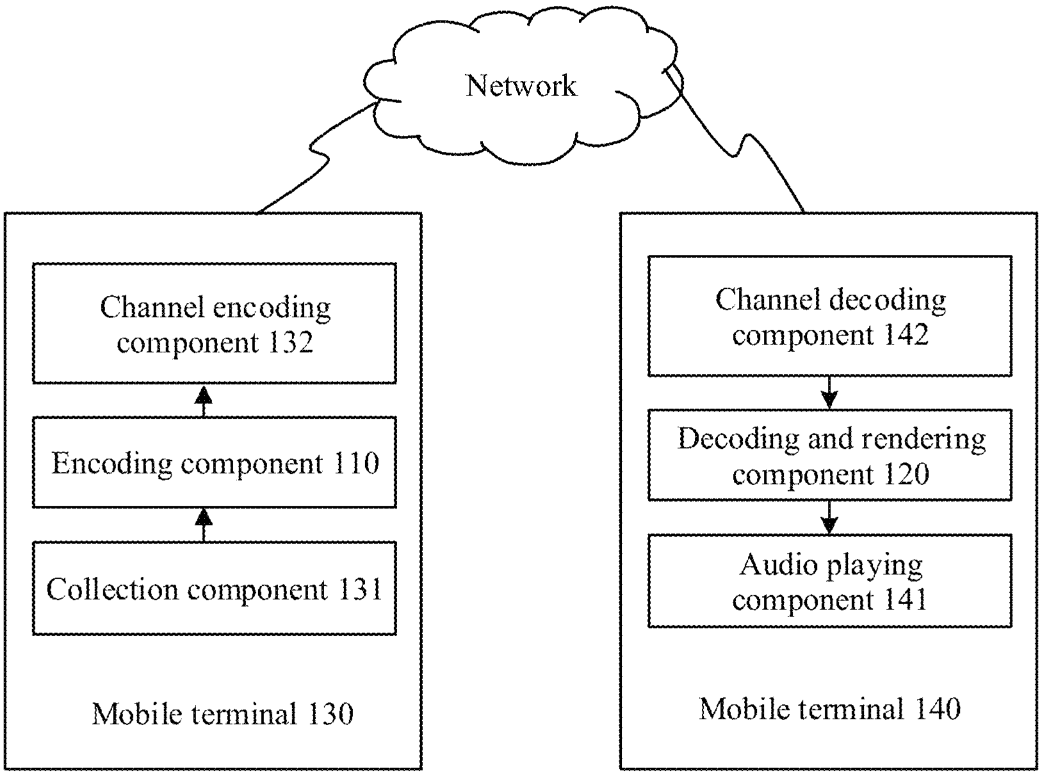
FIG. 2 is a diagram of a system architecture according to an embodiment of the present disclosure.

FIG. 2 is a diagram of a system architecture according to an embodiment of the present disclosure. As shown in FIG. 2, the system architecture includes a mobile terminal 130 and a mobile terminal 140. The mobile terminal 130 may be an audio signal transmit end, and the mobile terminal 140 may be an audio signal receive end.

The mobile terminal 130 and the mobile terminal 140 may be electronic devices that are independent of each other and that have an audio signal processing capability. For example, the mobile terminal 130 and the mobile terminal 140 may be mobile phones, wearable devices, virtual reality (VR) devices, augmented reality (AR) devices, or the like. The mobile terminal 130 is connected to the mobile terminal 140 through a wireless or wired network.

Optionally, the mobile terminal 130 may include a collection component 131, an encoding component 110, and a channel encoding component 132. The collection component 131 is connected to the encoding component 110, and the encoding component 110 is connected to the channel encoding component 132.

Optionally, the mobile terminal 140 may include an audio playing component 141, a decoding and rendering component 120, and a channel decoding component 142. The audio playing component 141 is connected to the decoding and rendering component 120, and the decoding and rendering component 120 is connected to the channel decoding component 142.

After collecting an audio signal through the collection component 131, the mobile terminal 130 encodes the audio signal through the encoding component 110, to obtain an audio signal encoded bitstream; and then encodes the audio signal encoded bitstream through the channel encoding component 132, to obtain a transmission signal.

The mobile terminal 130 sends the transmission signal to the mobile terminal 140 through the wireless or wired network.

After receiving the transmission signal, the mobile terminal 140 decodes the transmission signal through the channel decoding component 142, to obtain the audio signal encoded bitstream; decodes the audio signal encoded bitstream through the decoding and rendering component 120, to obtain a to-be-processed audio signal; and renders the to-be-processed audio signal through the decoding and rendering component 120, to obtain a rendered audio signal; and plays the rendered audio signal through the audio playing component 141. It may be understood that the mobile terminal 130 may alternatively include the components included in the mobile terminal 140, and the mobile terminal 140 may alternatively include the components included in the mobile terminal 130.

In addition, the mobile terminal 140 may further include an audio playing component, a decoding component, a rendering component, and a channel decoding component. The channel decoding component is connected to the decoding component, the decoding component is connected to the rendering component, and the rendering component is connected to the audio playing component. In this case, after receiving the transmission signal, the mobile terminal 140 decodes the transmission signal through the channel decoding component, to obtain the audio signal encoded bitstream; decodes the audio signal encoded bitstream through the decoding component, to obtain a to-be-processed audio signal; renders the to-be-processed audio signal through the rendering component, to obtain a rendered audio signal; and plays the rendered audio signal through the audio playing component.

Figure 3:
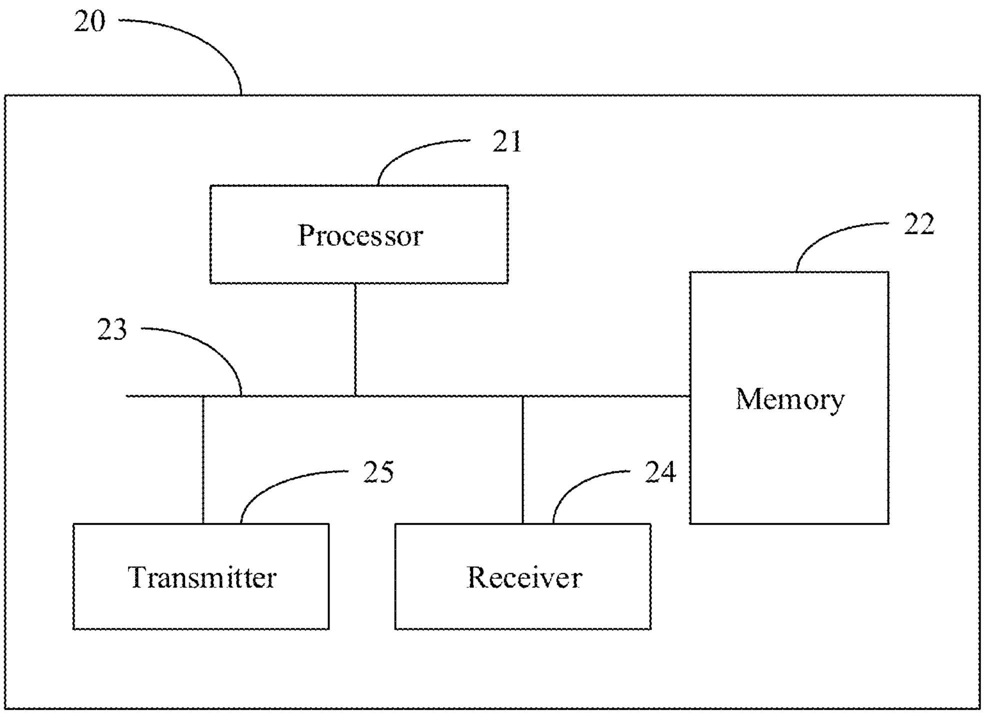
FIG. 3 is a structural block diagram of an audio signal receiving apparatus according to an embodiment of the present disclosure.

FIG. 3 is a structural block diagram of an audio signal receiving apparatus according to an embodiment of the present disclosure. Referring to FIG. 3, an audio signal receiving apparatus 20 in this embodiment of the present disclosure may include at least one processor 21, a memory 22, at least one communications bus 23, a receiver 24, and a transmitter 25. The communications bus 203 is used for connection and communication between the processor 21, the memory 22, the receiver 24, and the transmitter 25. The processor 21 may include a signal decoding component 211, a decoding component 212, and a rendering component 213.

For example, the memory 22 may be any one or any combination of the following storage media: a solid-state drive (SSD), a mechanical hard disk, a magnetic disk, a magnetic disk array, or the like, and can provide an instruction and data for the processor 21.

The memory 22 is configured to store the following data: correspondences between a plurality of preset positions and a plurality of HRTFs: (1) a plurality of positions relative to a left ear position, and HRTFs that are centered at the left ear position and that correspond to the positions relative to the left ear position; (2) a plurality of positions relative to a right ear position, and HRTFs that are centered at the right ear position and that correspond to the positions relative to the right ear position; (3) a plurality of positions relative to a head center, and HRTFs that are centered at the head center and that correspond to the positions relative to the head center.

Optionally, the memory 22 is further configured to store the following elements: an operating system and an application program module.

The operating system may include various system programs, and is configured to implement various basic services and process a hardware-based task. The application program module may include various application programs, and is configured to implement various application services.

The processor 21 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present disclosure. The processor may alternatively be a combination of processors implementing a computing function, for example, a combination of one or more microprocessors or a combination of a DSP and a microprocessor. The general-purpose processor may be a microprocessor, or the processor may be any conventional processor or the like.

The receiver 24 is configured to receive an audio signal from an audio signal sending apparatus.

The processor may invoke a program or the instruction and data stored in the memory 22, to perform the following steps: performing channel decoding on the received audio signal to obtain an audio signal encoded bitstream (this step may be implemented by a channel decoding component of the processor); and further decoding the audio signal encoded bitstream (this step may be implemented by a decoding component of the processor), to obtain a to-be-processed audio signal.

After obtaining the to-be-processed signal, the processor 21 is configured to: obtain M first audio signals by processing the to-be-processed audio signal by M first virtual speakers, and N second audio signals by processing the to-be-processed audio signal by N second virtual speakers, where the M first virtual speakers are in a one-to-one correspondence with the M first audio signals, the N second virtual speakers are in a one-to-one correspondence with the N second audio signals, and M and N are positive integers; obtain M first HRTFs and N second HRTFs, where all the M first HRTFs are centered at a left ear position, all the N second HRTFs are centered at a right ear position, the M first HRTFs are in a one-to-one correspondence with the M first virtual speakers, and the N second HRTFs are in a one-to-one correspondence with the N second virtual speakers; obtain a first target audio signal based on the M first audio signals and the M first HRTFs; and obtain a second target audio signal based on the N second audio signals and the N second HRTFs.

The M first virtual speakers are speakers in a first speaker group, the N second virtual speakers are speakers in a second speaker group, and the first speaker group and the second speaker group are two independent speaker groups. Alternatively, the M first virtual speakers are speakers in a first speaker group, the N second virtual speakers are speakers in a second speaker group, and the first speaker group and the second speaker group are a same speaker group, where M=N.

The processor 21 is configured to: convolve each of the M first audio signals with a corresponding first HRTF, to obtain M first convolved audio signals; and obtain the first target audio signal based on the M first convolved audio signals.

The processor 21 is further configured to: convolve each of the N second audio signals with a corresponding second HRTF, to obtain N second convolved audio signals; and obtain the second target audio signal based on the N second convolved audio signals.

The processor 21 is further configured to: obtain M first positions of the M first virtual speakers relative to the current left ear position; and determine, based on the M first positions and first correspondences stored in the memory 22, that M HRTFs corresponding to the M first positions are the M first HRTFs. The first correspondences include correspondences between a plurality of positions relative to the left ear position, and a plurality of HRTFs that are centered at the left ear position and that correspond to the positions relative to the left ear position.

The processor 21 is further configured to: obtain N second positions of the N second virtual speakers relative to the current right ear position; and determine, based on the N second positions and second correspondences stored in the memory 22, that N HRTFs corresponding to the N second positions are the N second HRTFs. The second correspondences include correspondences between a plurality of positions relative to the right ear position, and a plurality of HRTFs that are centered at the right ear position and that correspond to the positions relative to the right ear position.

The processor 21 is further configured to: obtain M third positions of the M first virtual speakers relative to a current head center, where the third position includes a first azimuth and a first elevation of the first virtual speaker relative to the current head center, and includes a first distance between the current head center and the first virtual speaker; determine M fourth positions based on the M third positions, where the M third positions are in a one-to-one correspondence with the M fourth positions, one fourth position and a corresponding third position include a same elevation and a same distance, a difference between an azimuth included in the one fourth position and a first value is a first azimuth included in the corresponding third position, where the first value is a difference between a first included angle and a second included angle, the first included angle is an included angle between a first straight line and a first plane, the second included angle is an included angle between a second straight line and the first plane, the first straight line is a straight line that passes through the current left ear and a coordinate origin of a three-dimensional coordinate system, the second straight line is a straight line that passes through the current head center and the coordinate origin, and the first plane is a plane constituted by an X axis and a Z axis of the three-dimensional coordinate system; and determine, based on the M fourth positions and third correspondences stored in the memory 22, that M HRTFs corresponding to the M fourth positions are the M first HRTFs. The third correspondences include correspondences between a plurality of positions relative to the head center, and a plurality of HRTFs that are centered at the head center and that correspond to the positions relative to the head center.

The processor 21 is further configured to: obtain N fifth positions of the N second virtual speakers relative to the current head center, where the fifth position includes a second azimuth and a second elevation of the second virtual speaker relative to the current head center, and includes a second distance between the current head center and the second virtual speaker; determine N sixth positions based on the N fifth positions, where the N fifth positions are in a one-to-one correspondence with the N sixth positions, one sixth position and a corresponding fifth position include a same elevation and a same distance, a sum of an azimuth included in the one sixth position and a second value is a second azimuth included in the corresponding fifth position, where the second value is a difference between a third included angle and a second included angle, the second included angle is an included angle between a second straight line and a first plane, the third included angle is an included angle between a third straight line and the first plane, the second straight line is the straight line that passes through the current head center and the coordinate origin, the third straight line is a straight line that passes through the current right ear and the coordinate origin, and the first plane is the plane constituted by the X axis and the Z axis of the three-dimensional coordinate system; and determine, based on the N sixth positions and the third correspondences, that N HRTFs corresponding to the N sixth positions are the N second HRTFs.

The processor 21 is further configured to: obtain M third positions of the M first virtual speakers relative to a current head center, where the third position includes a first azimuth and a first elevation of the first virtual speaker relative to the current head center, and includes a first distance between the current head center and the first virtual speaker; determine M seventh positions based on the M third positions, where the M third positions are in a one-to-one correspondence with the M seventh positions, one seventh position and a corresponding third position include a same elevation and a same distance, and a difference between an azimuth included in the one seventh position and a first preset value is a first azimuth included in the corresponding third position; and determine, based on the M seventh positions and the third correspondences, that M HRTFs corresponding to the M seventh positions are the M first HRTFs.

The processor 21 is further configured to: obtain N fifth positions of the N second virtual speakers relative to the current head center, where the fifth position includes a second azimuth and a second elevation of the second virtual speaker relative to the current head center, and includes a second distance between the current head center and the second virtual speaker; determine N eighth positions based on the N fifth positions, where the N fifth positions are in a one-to-one correspondence with the N eighth positions, one eighth position and a corresponding fifth position include a same elevation and a same distance, and a sum of an azimuth included in the one eighth position and the first preset value is a second azimuth included in the corresponding fifth position; and determine, based on the N eighth positions and the third correspondences, that N HRTFs corresponding to the N eighth positions are the N second HRTFs.

Before the M first audio signals are obtained by processing the to-be-processed audio signal by the M first virtual speakers, the processor 21 is further configured to: obtain a target virtual speaker group, where the target virtual speaker group includes M target virtual speakers, and the M target virtual speakers are in a one-to-one correspondence with the M first virtual speakers; and determine M tenth positions of the M first virtual speakers relative to the coordinate origin of the three-dimensional coordinate system based on M ninth positions of the M target virtual speakers relative to the coordinate origin, where the M ninth positions are in a one-to-one correspondence with the M tenth positions, one tenth position and a corresponding ninth position include a same elevation and a same distance, and a difference between an azimuth included in the one tenth position and a second preset value is an azimuth included in the corresponding ninth position.

The processor 21 is configured to process the to-be-processed audio signal based on the M tenth positions, to obtain the M first audio signals.

Before the N second audio signals are obtained by processing the to-be-processed audio signal by the N second virtual speakers, the processor 21 is further configured to: obtain a target virtual speaker group, where the target virtual speaker group includes M target virtual speakers, and the M target virtual speakers are in a one-to-one correspondence with the N second virtual speakers, and M=N; and determine N eleventh positions of the N second virtual speakers relative to the coordinate origin of the three-dimensional coordinate system based on the M ninth positions of the M target virtual speakers relative to the coordinate origin, where the M ninth positions are in a one-to-one correspondence with the N eleventh positions, one eleventh position and a corresponding ninth position include a same elevation and a same distance, and a sum of an azimuth included in the one eleventh position and a second preset value is an azimuth included in the corresponding ninth position.

The processor 21 is configured to process the to-be-processed audio signal based on the N eleventh positions, to obtain the N second audio signals.

It may be understood that each method after the processor 21 obtains the to-be-processed signal may be performed by the rendering component in the processor.

According to the audio signal receiving apparatus in this embodiment, the first target audio signal that is transmitted to the left ear is obtained based on the M first audio signals and the M first HRTFs centered at the left ear position, such that a signal that is transmitted to the left ear position is optimal. In addition, the second target audio signal that is transmitted to the right ear is obtained based on the N second audio signals and the N second HRTFs centered at the right ear position, such that a signal that is transmitted to the right ear position is optimal. Therefore, quality of an obtained audio signal output by the audio signal receive end is improved.

The following uses embodiments to describe an audio processing method in the present disclosure. The following embodiments are all executed by an audio signal receive end, for example, the mobile terminal 140 shown in FIG. 2.

Figure 4:
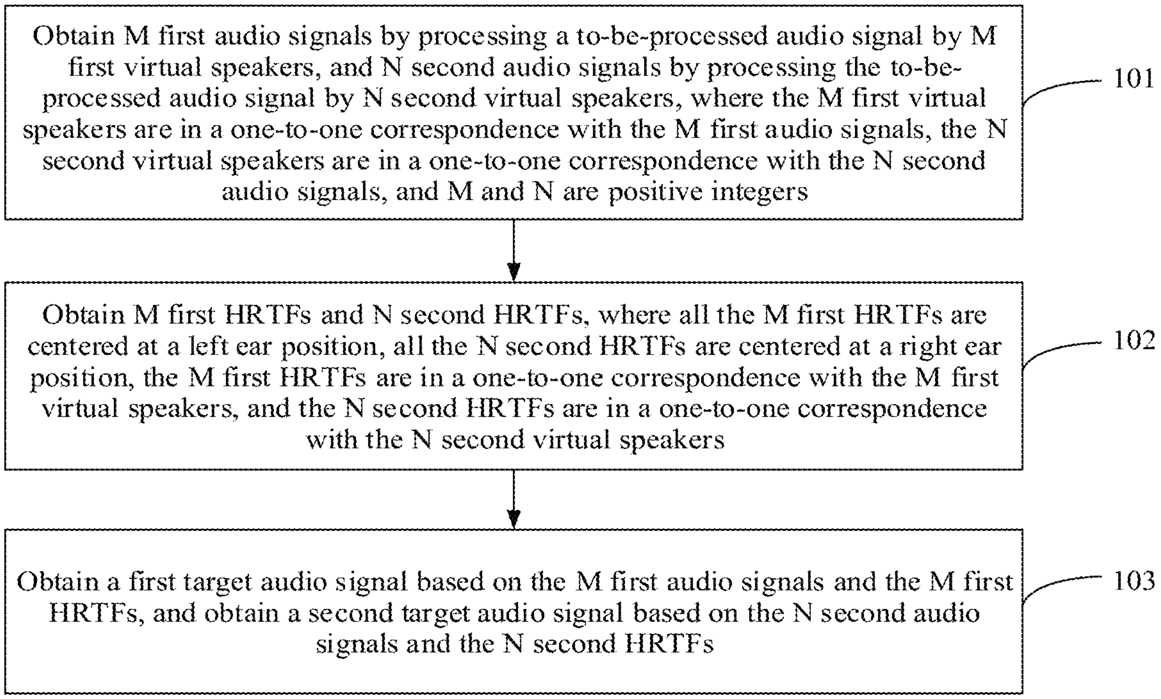
FIG. 4 is a flowchart of an audio processing method according to an embodiment of the present disclosure.

FIG. 4 is a flowchart 1 of an audio processing method according to an embodiment of the present disclosure. Referring to FIG. 4, the method in this embodiment includes the following steps.

Step S101: Obtain M first audio signals by processing a to-be-processed audio signal by M first virtual speakers, and N second audio signals by processing the to-be-processed audio signal by N second virtual speakers, where the M first virtual speakers are in a one-to-one correspondence with the M first audio signals, the N second virtual speakers are in a one-to-one correspondence with the N second audio signals, and M and N are positive integers.

Step S102: Obtain M first HRTFs and N second HRTFs, where all the M first HRTFs are centered at a left ear position, all the N second HRTFs are centered at a right ear position, the M first HRTFs are in a one-to-one correspondence with the M first virtual speakers, and the N second HRTFs are in a one-to-one correspondence with the N second virtual speakers.

Step S103: Obtain a first target audio signal based on the M first audio signals and the M first HRTFs, and obtain a second target audio signal based on the N second audio signals and the N second HRTFs.

For example, the method in this embodiment of the present disclosure may be performed by the mobile terminal 140. An encoder side collects a stereo signal sent by a sound source, and an encoding component of the encoder side encodes the stereo signal sent by the sound source, to obtain an encoded signal. Then, the encoded signal is transmitted to an audio signal receive end through a wireless or wired network, and the audio signal receive end decodes the encoded signal. A signal obtained through decoding is the to-be-processed audio signal in this embodiment. In other words, the to-be-processed audio signal in this embodiment may be a signal obtained through decoding by a decoding component in a processor, or a signal obtained through decoding by the decoding and rendering component 120 or the decoding component in the mobile terminal 140 in FIG. 2.

It may be understood that, if a standard used for processing the audio signal is Ambisonic, the encoded signal obtained by the encoder side is a standard Ambisonic signal. Correspondingly, a signal obtained through decoding by the audio signal receive end is also an Ambisonic signal, for example, a B-format Ambisonic signal. The Ambisonic signal includes a first-order Ambisonic (FOA) signal and a high-order Ambisonic signal.

The following describes this embodiment using an example in which the to-be-processed audio signal obtained by the audio signal receive end through decoding is the B-format Ambisonic signal.

In step S101, the M first virtual speakers may constitute a first virtual speaker group, the N second virtual speakers may constitute a second virtual speaker group, and the first virtual speaker group and the second virtual speaker group may be a same virtual speaker group, or may be different virtual speaker groups. If the first virtual speaker group and the second virtual speaker group are a same virtual speaker group, M=N, and the first virtual speaker is the same as the second virtual speaker.

Optionally, M may be any one of 4, 8, 16, and the like, and N may be any one of 4, 8, 16, and the like.

The first virtual speaker may process the to-be-processed audio signal into the first audio signal according to the following Formula 1, where the M first virtual speakers are in a one-to-one correspondence with the M first audio signals:

$$P_{1m} = \frac{1}{L}\left(W\frac{1}{\sqrt{2}} + X(\cos(\phi_{1m})\cos(\theta_{1m})) + Y(\sin(\phi_{1m})\cos(\theta_{1m})) + Z(\sin(\phi_{1m}))\right) \quad \text{Formula 1}$$

where $1 \le m \le M$; $P_{1m}$ represents an mth first audio signal obtained by processing the to-be-processed audio signal by an mth first virtual speaker; W represents a component corresponding to all sounds included in an environment of the sound source, and is referred to as an environment component; X represents a component, on an X axis, of all the sounds included in the environment of the sound source, and is referred to as an X-coordinate component; Y represents a component, on a Y axis, of all the sounds included in the environment of the sound source, and is referred to as a Y-coordinate component; and Z represents a component, on a Z axis, of all the sounds included in the environment of the sound source, and is referred to as a Z-coordinate component.

The X axis, the Y axis, and the Z axis herein are respectively an X axis, a Y axis, and a Z axis of a three-dimensional coordinate system corresponding to the sound source (namely, a three-dimensional coordinate system corresponding to an audio signal transmit end), and L represents an energy adjustment coefficient. $\phi_{1_m}$ represents an elevation of the mth first virtual speaker relative to a coordinate origin of a three-dimensional coordinate system corresponding to the audio signal receive end, and $\theta_{1_m}$ represents an azimuth of the mth first virtual speaker relative to the coordinate origin.

The first audio signal may be a multi-channel signal, or may be a mono signal.

The second virtual speaker may process the to-be-processed audio signal into the second audio signal according to the following Formula 2, where the N second virtual speakers are in a one-to-one correspondence with the N second audio signals:

$$P_{1n} = \frac{1}{L}\left(W\frac{1}{\sqrt{2}} + X(\cos(\phi_{1n})\cos(\theta_{1n})) + Y(\sin(\phi_{1n})\cos(\theta_{1n})) + Z(\sin(\phi_{1n}))\right) \quad \text{Formula 2}$$

where 1≤n≤N; $P_{1_n}$ represents an nth first audio signal obtained by processing the to-be-processed audio signal by an nth first virtual speaker; W represents the component corresponding to all the sounds included in the environment of the sound source, and is referred to as the environment component; X represents the component, on the X axis, of all the sounds included in the environment of the sound source, and is referred to as the X-coordinate component; Y represents the component, on the Y axis, of all the sounds included in the environment of the sound source, and is referred to as the Y-coordinate component; and Z represents the component, on the Z axis, of all the sounds included in the environment of the sound source, and is referred to as the Z-coordinate component.

The X axis, the Y axis, and the Z axis herein are respectively the X axis, the Y axis, and the Z axis of the three-dimensional coordinate system corresponding to the environment of the sound source, and L represents the energy adjustment coefficient. $\phi_{1_n}$ represents an elevation of the nth first virtual speaker relative to the coordinate origin of a three-dimensional coordinate system corresponding to the audio signal receive end, and $\theta_{1_n}$ represents an azimuth of the nth first virtual speaker relative to the coordinate origin.

The second audio signal may be a multi-channel signal, or may be a mono signal.

In step S102, the M first HRTFs may be referred to as the M first HRTFs corresponding to the M first virtual speakers, and each first virtual speaker corresponds to one first HRTF. In other words, the M first HRTFs are in a one-to-one correspondence with the M first virtual speakers. The N second HRTFs may be referred to as the N second HRTFs corresponding to the N second virtual speakers, and each second virtual speaker corresponds to one second HRTF. In other words, the N second HRTFs are in a one-to-one correspondence with the N second virtual speakers.

In the conventional technology, the first HRTF is an HRTF that is centered at a head center, and the second HRTF is an HRTF that is also centered at the head center.

In this embodiment, "centered at the head center" means using the head center as a center to measure the HRTF.

Figure 5:
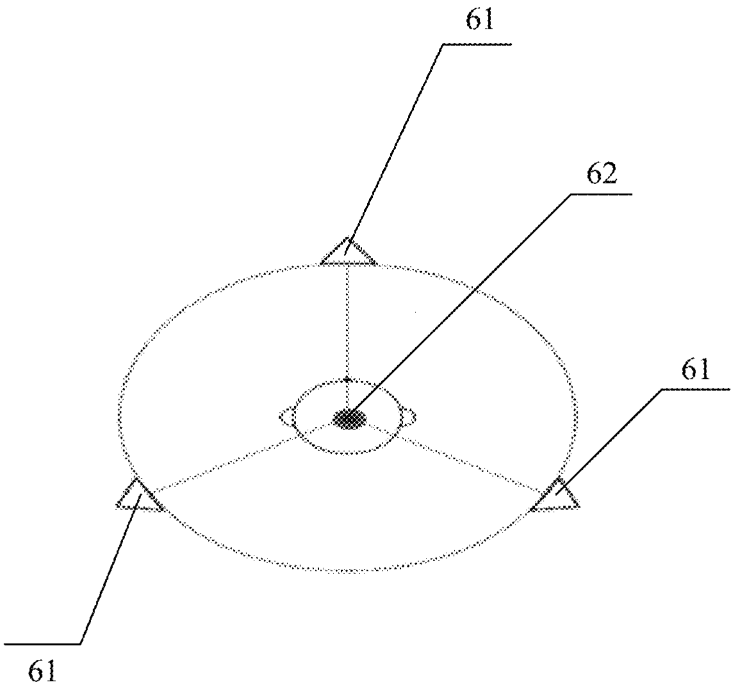
FIG. 5 is a diagram of a measurement scenario in which an HRTF is measured using a head center as a center according to an embodiment of the present disclosure.

FIG. 5 is a diagram of a measurement scenario in which an HRTF is measured using a head center as a center according to an embodiment of the present disclosure. FIG. 5 shows several positions 61 relative to a head center 62. It may be understood that there are a plurality of HRTFs centered at the head center, and audio signals that are sent by first sound sources at different positions 61 correspond to different HRTFs that are centered at the head center when the audio signals are transmitted to the head center. When the HRTF centered at the head center is measured, the head center may be a head center of a current listener, or may be a head center of another listener, or may be a head center of a virtual listener.

In this way, HRTFs corresponding to a plurality of preset positions can be obtained by setting first sound sources at different preset positions relative to the head center 62. To be more specific, if a position of a first sound source 1 relative to the head center 62 is a position c, an HRTF 1 that is used to transmit, to the head center 62, a signal sent by the first sound source 1 and that is obtained through measurement is an HRTF 1 that is centered at the head center 62 and that corresponds to the position c; if a position of a first sound source 2 relative to the head center 62 is a position d, an HRTF 2 that is used to transmit, to the head center 62, a signal sent by the first sound source 2 and that is obtained through measurement is an HRTF 2 that is centered at the head center 62 and that corresponds to the position d; and so on. The position c includes an azimuth 1, an elevation 1, and a distance 1. The azimuth 1 is an azimuth of the first sound source 1 relative to the head center 62. The elevation 1 is an elevation of the first sound source 1 relative to the head center 62. The distance 1 is a distance between the first sound source 1 and the head center 62. Likewise, the position d includes an azimuth 2, an elevation 2, and a distance 2. The azimuth 2 is an azimuth of the first sound source 2 relative to the head center 62. The elevation 2 is an elevation of the first sound source 2 relative to the head center 62. The distance 2 is a distance between the first sound source 2 and the head center 62.

During setting positions of the first sound sources relative to the head center 62, when distances and elevations do not change, azimuths of adjacent first sound sources may be spaced by a first preset angle; when distances and azimuths do not change, elevations of adjacent first sound sources may be spaced by a second preset angle; and when elevations and azimuths do not change, distances between adjacent first sound sources may be spaced by a first preset distance. The first preset angle may be any one of 3° to 10°, for example, 5°. The second preset angle may be any one of 3° to 10°, for example, 5°. The first distance may be any one of 0.05 m to 0.2 m, for example, 0.1 m.

For example, a process of obtaining the HRTF 1 that is centered at the head center and that corresponds to the position c (100°, 50°, 1 m) is as follows: The first sound source 1 is placed at a position at which an azimuth relative to the head center is 100°, an elevation relative to the head center is 50°, and a distance from the head center is 1 m; and a corresponding HRTF that is used to transmit, to the head center 62, an audio signal sent by the first sound source 1 is measured, in order to obtain the HRTF 1 centered at the head center. The measurement method is an existing method, and details are not described herein.

For another example, a process of obtaining the HRTF 2 that is centered at the head center and that corresponds to the position d (100°, 45°, 1 m) is as follows: The first sound source 2 is placed at a position at which an azimuth relative to the head center is 100°, an elevation relative to the head center is 45°, and a distance from the head center is 1 m; and a corresponding HRTF that is used to transmit, to the head center 62, an audio signal sent by the first sound source 2 is measured, in order to obtain the HRTF 2 centered at the head center.

For another example, a process of obtaining the HRTF 3 that is centered at the head center and that corresponds to a position e (95°, 45°, 1 m) is as follows: A first sound source 3 is placed at a position at which an azimuth relative to the head center is 95°, an elevation relative to the head center is 45°, and a distance from the head center is 1 m; and a corresponding HRTF that is used to transmit, to the head center 62, an audio signal sent by the first sound source 3 is measured, in order to obtain the HRTF 3 centered at the head center.

For another example, a process of obtaining the HRTF 4 that is centered at the head center and that corresponds to a position f (95°, 50°, 1 m) is as follows: A first sound source 4 is placed at a position at which an azimuth relative to the head center is 95°, an elevation relative to the head center is 50°, and a distance from the head center is 1 m; and a corresponding HRTF that is used to transmit, to the head center 62, an audio signal sent by the first sound source 4 is measured, in order to obtain the HRTF 4 centered at the head center.

For another example, a process of obtaining the HRTF 5 that is centered at the head center and that corresponds to a position g (100°, 50°, 1.1 m) is as follows: A first sound source 5 is placed at a position at which an azimuth relative to the head center is 100°, an elevation relative to the head center is 50°, and a distance from the head center is 1.1 m; and a corresponding HRTF that is used to transmit, to the head center 62, an audio signal sent by the first sound source 5 is measured, in order to obtain the HRTF 5 centered at the head center.

It should be noted that in a subsequent position (x, x, x), the first x represents an azimuth, the second x represents an elevation, and the third x represents a distance.

According to the foregoing method, the correspondences between a plurality of positions and a plurality of HRTFs centered at the head center may be obtained through measurement. It may be understood that, during measurement of the HRTFs centered at the head center, the plurality of positions at which the first sound sources are placed may be referred to as preset positions. Therefore, according to the foregoing method, the correspondences between the plurality of preset positions and the plurality of HRTFs centered at the head center may be obtained through measurement. The correspondences are referred to as second correspondences, and the second correspondences may be stored in the memory 22 shown in FIG. 3.

During actual application of the foregoing conventional technology, a position a of a first virtual speaker relative to a current left ear position is obtained, and an HRTF, centered at the head center, that is obtained through measurement and that corresponds to the position a is an HRTF corresponding to the first virtual speaker. A position b of a second virtual speaker relative to a current right ear position is obtained, and an HRTF, centered at the head center, that is obtained through measurement and that corresponds to the position b is an HRTF corresponding to the second virtual speaker. It can be learned that the position a is not a position of the first virtual speaker relative to the head center, but a position of the first virtual speaker relative to the left ear position. If the HRTF that is centered at the head center and that corresponds to the position a is still used as the HRTF corresponding to the first virtual speaker, a finally obtained signal that is transmitted to the left ear is not an optimal signal. The optimal signal is located at the head center. Likewise, it can be learned that the position b is not a position of the second virtual speaker relative to the head center, but a position of the second virtual speaker relative to the right ear position. If the HRTF that is centered at the head center and that corresponds to the position b is still used as the HRTF corresponding to the second virtual speaker, a finally obtained signal that is transmitted to the right ear is not an optimal signal. The optimal signal is located at the head center.

In this embodiment, the obtained first HRTF corresponding to the first virtual speaker is an HRTF centered at the left ear position. The second HRTF corresponding to the second virtual speaker is an HRTF centered at the right ear position.

In this embodiment, "centered at the left ear position" means using the left ear position as a center to measure the HRTF, and "centered at the right ear position" means using the right ear position as a center to measure the HRTF.

The HRTF centered at the left ear position may be obtained through actual measurement. To be more specific, an audio signal a sent by a sound source at the position a relative to the left ear position is collected, an audio signal b that is obtained after the audio signal a is transmitted to the left ear position is collected, and the HRTF centered at the left ear position is obtained based on the audio signal a and the audio signal b. The HRTF centered at the left ear position may alternatively be converted from the HRTF centered at the head center. The two obtaining manners are described in detail in subsequent embodiments.

Likewise, the HRTF centered at the right ear position may be obtained through actual measurement. To be more specific, an audio signal c sent by a sound source at the position b relative to the right ear position is collected, an audio signal d that is obtained after the audio signal c is transmitted to the right ear position is collected, and the HRTF centered at the right ear position is obtained based on the audio signal c and the audio signal d. The HRTF centered at the right ear position may alternatively be converted from the HRTF centered at the head center. The two obtaining manners are described in detail in subsequent embodiments.

In step S103, the first target audio signal is obtained based on the M first audio signals and the M first HRTFs, and the second target audio signal is obtained based on the N second audio signals and the N second HRTFs.

For example, that the first target audio signal is obtained based on the M first audio signals and the M first HRTFs includes: convolving each of the M first audio signals with a corresponding first HRTF, to obtain M first convolved audio signals; and obtaining the first target audio signal based on the M first convolved audio signals.

To be more specific, an mth first audio signal output by an mth first virtual speaker is convolved with a first HRTF corresponding to the mth first virtual speaker, to obtain an mth convolved audio signal. When there are M first virtual speakers, M first convolved audio signals are obtained.

A signal obtained after the M first convolved audio signals are superposed is the first target audio signal, namely, an audio signal that is transmitted to the left ear position, or an audio signal that corresponds to the left ear position and that is obtained through rendering.

Because the mth first audio signal output by the mth first virtual speaker is convolved with the first HRTF corresponding to the mth first virtual speaker, the first HRTF corresponding to the mth first virtual speaker is an HRTF that is centered at the left ear position and that corresponds to the mth first audio signal. In this case, the obtained first target audio signal that is transmitted to the left ear position is an optimal signal.

The second target audio signal is obtained based on the N second audio signals and the N second HRTFs.

Each of the N second audio signals is convolved with a corresponding second HRTF, to obtain the N second convolved audio signals.

The second target audio signal is obtained based on the N second convolved audio signals.

To be more specific, an nth second audio signal output by an nth second virtual speaker is convolved with a second HRTF corresponding to the nth second virtual speaker, to obtain an nth convolved audio signal. When there are N first virtual speakers, N second convolved audio signals are obtained.

A signal obtained after the N second convolved audio signals are superposed is the second target audio signal, namely, an audio signal that is transmitted to the right ear position, or an audio signal that corresponds to the right ear position and that is obtained through rendering.

Because the nth second audio signal output by the nth second virtual speaker is convolved with the second HRTF corresponding to the nth second virtual speaker, the second HRTF corresponding to the nth second virtual speaker is an HRTF centered at the right ear position. In this case, the obtained second target audio signal that is transmitted to the right ear position is an optimal signal.

It may be understood that the first target audio signal and the second target audio signal herein are rendered audio signals, and the first target audio signal and the second target audio signal form a stereo signal finally output by an audio signal receive end.

In this embodiment, the first target audio signal that is transmitted to the left ear is obtained based on the M first audio signals and the M first HRTFs centered at the left ear position, such that a signal that is transmitted to the left ear position is optimal. In addition, the second target audio signal that is transmitted to the right ear is obtained based on the N second audio signals and the N second HRTFs centered at the right ear position, such that a signal that is transmitted to the right ear position is optimal. Therefore, quality of an audio signal output by the audio signal receive end is improved.

The following uses embodiments shown in FIG. 6 to FIG. 15 to describe in detail the embodiment shown in FIG. 4. Same terms in the embodiments shown in FIG. 6 to FIG. 15 and the embodiment shown in FIG. 4 have same meanings.

Figure 6:
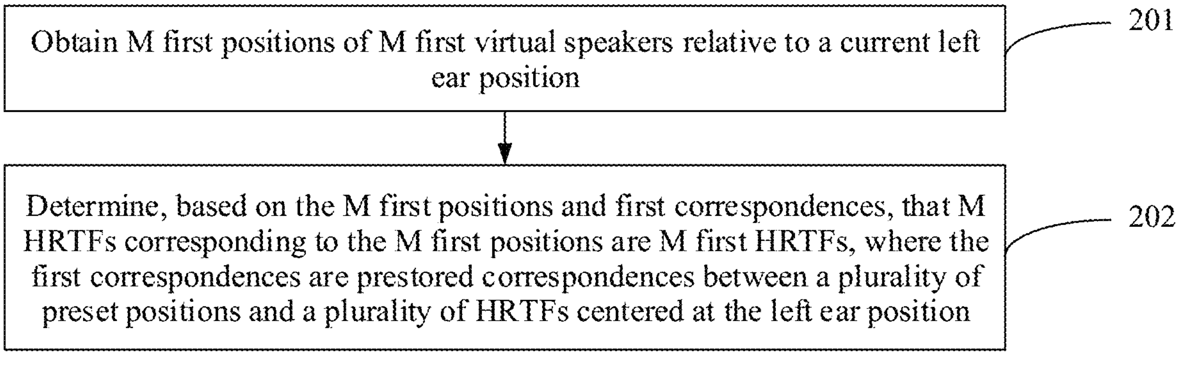
FIG. 6 is a flowchart of an audio processing method according to an embodiment of the present disclosure.

First, a first method for obtaining M first HRTFs in step S102 in the embodiment shown in FIG. 4 is described. FIG. 6 is a flowchart 2 of an audio processing method according to an embodiment of the present disclosure. Referring to FIG. 6, the method in this embodiment includes the following steps.

Step S201: Obtain M first positions of M first virtual speakers relative to a current left ear position.

Step S202: Determine, based on the M first positions and first correspondences, that M HRTFs corresponding to the M first positions are the M first HRTFs, where the first correspondences are prestored correspondences between a plurality of preset positions and a plurality of HRTFs centered at the left ear position.

For example, in step S201, a first position of each first virtual speaker relative to the current left ear position is obtained. If there are M first virtual speakers, M first positions are obtained.

Each first position includes a third elevation and a third azimuth of a corresponding first virtual speaker relative to the current left ear position, and includes a third distance between the first virtual speaker and the current left ear position. The current left ear position is the left ear of a current listener.

In step S202, before step S202, correspondences between a plurality of preset positions and a plurality of HRTFs centered at the left ear position need to be obtained in advance.

Figure 7:
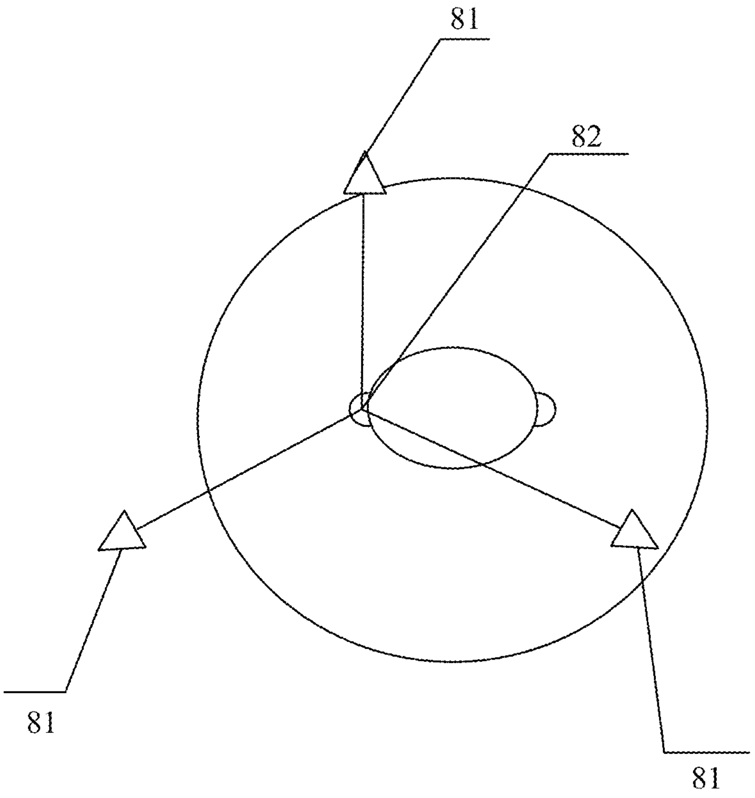
FIG. 7 is a diagram of a measurement scenario in which an HRTF is measured using a left ear position as a center according to an embodiment of the present disclosure.

FIG. 7 is a diagram of a measurement scenario in which an HRTF is measured using a left ear position as a center according to an embodiment of the present disclosure. FIG. 7 shows several positions 81 relative to a left ear position 82. It may be understood that there are a plurality of HRTFs centered at the left ear position, and audio signals that are sent by second sound sources at different positions 81 correspond to different HRTFs when the audio signals are transmitted to the left ear position. In other words, before step S202, HRTFs that are centered at the left ear position and that correspond to the plurality of positions 81 need to be measured in advance. When the HRTF centered at the left ear position is measured, the left ear position may be a current left ear position of a current listener, or may be a left ear position of another listener, or may be a left ear position of a virtual listener.

Second sound sources are placed at different positions relative to the left ear position 82, to obtain HRTFs that are centered at the left ear position and that correspond to the plurality of positions 81. To be more specific, if a position of a second sound source 1 relative to the left ear position 82 is a position c, an HRTF that is used to transmit, to the left ear position 82, a signal sent by the second sound source 1 and that is obtained through measurement is an HRTF 1 that is centered at the left ear position 82 and that corresponds to the position c; if a position of a second sound source 2 relative to the left ear position 82 is a position d, an HRTF that is used to transmit, to the left ear position 82, a signal sent by the second sound source 2 and that is obtained through measurement is an HRTF 2 that is centered at the left ear position and that corresponds to the position d; and so on. The position c includes an azimuth 1, an elevation 1, and a distance 1. The azimuth 1 is an azimuth of the second sound source 1 relative to the left ear position 82. The elevation 1 is an elevation of the second sound source 1 relative to the left ear position 82. The distance 1 is a distance between the second sound source 1 and the left ear position 82. Likewise, the position d includes an azimuth 2, an elevation 2, and a distance 2. The azimuth 2 is an azimuth of the second sound source 2 relative to the left ear position 82. The elevation 2 is an elevation of the second sound source 2 relative to the left ear position 82. The distance 2 is a distance between the second sound source 2 and the left ear position 82.

It may be understood that, during setting positions of the second sound sources relative to the left ear position 82, when distances and elevations do not change, azimuths of adjacent second sound sources may be spaced by a first angle; when distances and azimuths do not change, elevations of adjacent second sound sources may be spaced by a second angle; and when elevations and azimuths do not change, distances between adjacent second sound sources may be spaced by a first distance. The first angle may be any one of 3° to 10°, for example, 5°. The second angle may be any one of 3° to 10°, for example, 5°. The first distance may be any one of 0.05 m to 0.2 m, for example, 0.1 m.

For example, a process of obtaining the HRTF 1 that is centered at the left ear position and that corresponds to the position c (100°, 50°, 1 m) is as follows: The second sound source 1 is placed at a position at which an azimuth relative to the left ear position 82 is 100°, an elevation relative to the left ear position 82 is 50°, and a distance from the left ear position 82 is 1 m; and a corresponding HRTF that is used to transmit, to the left ear position, an audio signal sent by the second sound source 1 is measured, in order to obtain the HRTF 1 centered at the left ear position.

For another example, a process of obtaining the HRTF 2 that is centered at the left ear position and that corresponds to the position d (100°, 45°, 1 m) is as follows: The second sound source 2 is placed at a position at which an azimuth relative to the left ear position 82 is 100°, an elevation relative to the left ear position 82 is 45°, and a distance from the left ear position 82 is 1 m; and a corresponding HRTF that is used to transmit, to the left ear position, an audio signal sent by the second sound source 2 is measured, in order to obtain the HRTF 2 centered at the left ear position.

For another example, a process of obtaining an HRTF 3 that is centered at the left ear position and that corresponds to a position e (95°, 50°, 1 m) is as follows: A second sound source 3 is placed at a position at which an azimuth relative to the left ear position 82 is 95°, an elevation relative to the left ear position 82 is 50°, and a distance from the left ear position 82 is 1 m; and a corresponding HRTF that is used to transmit, to the left ear position, an audio signal sent by the second sound source 3 is measured, in order to obtain the HRTF 3 centered at the left ear position.

For another example, a process of obtaining an HRTF 4 that is centered at the left ear position and that corresponds to a position f (95°, 45°, 1 m) is as follows: A second sound source 4 is placed at a position at which an azimuth relative to the left ear position 82 is 95°, an elevation relative to the left ear position 82 is 40°, and a distance from the left ear position 82 is 1 m; and a corresponding HRTF that is used to transmit, to the left ear position, an audio signal sent by the second sound source 4 is measured, in order to obtain the HRTF 4 centered at the left ear position.

For another example, a process of obtaining an HRTF 5 that is centered at the left ear position and that corresponds to a position g (100°, 50°, 1.2 m) is as follows: A second sound source 5 is placed at a position at which an azimuth relative to the left ear position 82 is 100°, an elevation relative to the left ear position 82 is 50°, and a distance from the left ear position 82 is 1.2 m; and a corresponding HRTF that is used to transmit, to the left ear position, an audio signal sent by the second sound source 5 is measured, in order to obtain the HRTF 5 centered at the left ear position.

For another example, a process of obtaining an HRTF 6 that is centered at the left ear position and that corresponds to a position h (95°, 50°, 1.1 m) is as follows: A second sound source 6 is placed at a position at which an azimuth relative to the left ear position 82 is 95°, an elevation relative to the left ear position 82 is 50°, and a distance from the left ear position 82 is 1.1 m; and a corresponding HRTF that is used to transmit, to the left ear position, an audio signal sent by the second sound source 6 is measured, in order to obtain the HRTF 6 centered at the left ear position.

It may be understood that an azimuth ranges from −180° to 180° and an elevation ranges from −90° to 90°. In this case, if the first angle is 5°, the second angle is 5°, the first distance is 0.1 m, and a total distance is 2 m, 72×36×21 HRTFs centered at the left ear position may be obtained.

According to the foregoing method, correspondences between a plurality of positions and a plurality of HRTFs centered at the left ear position may be obtained through measurement. It may be understood that, during measurement of the HRTFs centered at the left ear position, the plurality of positions at which the second sound sources are placed may be referred to as preset positions. Therefore, according to the foregoing method, the correspondences between the plurality of preset positions and the plurality of HRTFs centered at the left ear position may be obtained through measurement. The correspondences may be referred to as first correspondences, and the first correspondences may be stored in the memory 22 shown in FIG. 3.

Then, the determining, based on the M first positions and first correspondences, that M HRTFs corresponding to the M first positions are the M first HRTFs, where the first correspondences are prestored correspondences between a plurality of preset positions and a plurality of HRTFs centered at the left ear position includes: determining M first preset positions associated with the M first positions, where the M first preset positions are preset positions in the first correspondences; and determining, based on the first correspondences, that M HRTFs that are centered at the left ear position and that correspond to the M first preset positions are the M first HRTFs. The M HRTFs centered at the left ear position are actually M HRTFs that are centered at the left ear position 82 and that are used to transmit, to the left ear position 82, audio signals sent by sound sources at the M first preset positions.

The first preset position associated with the first position may be the first position; or an elevation included in the first preset position is a target elevation that is closest to a third elevation included in the first position, an azimuth included in the first preset position is a target azimuth that is closest to a third azimuth included in the first position, and a distance included in the first preset position is a target distance that is closest to a third distance included in the first position. The target azimuth is an azimuth included in a corresponding preset position during measurement of the HRTF centered at the left ear position, namely, an azimuth of the placed second sound source relative to the left ear position during measurement of the HRTF centered at the left ear position. The target elevation is an elevation in a corresponding preset position during measurement of the HRTF centered at the left ear position, namely, an elevation of the placed second sound source relative to the left ear position during measurement of the HRTF centered at the left ear position. The target distance is a distance in a corresponding preset position during measurement of the HRTF centered at the left ear position, namely, a distance between the placed second sound source and the left ear position during measurement of the HRTF centered at the left ear position. In other words, all the first preset positions are positions at which the second sound sources are placed during measurement of the plurality of HRTFs centered at the left ear position. In other words, an HRTF that is centered at the left ear position and that corresponds to each first preset position is measured in advance.

It may be understood that, if the third azimuth included in the first position is between two target azimuths, one of the two target azimuths may be determined, according to a preset rule, as the azimuth included in the first preset position. For example, the preset rule is as follows: If the third azimuth included in the first position is between the two target azimuths, a target azimuth in the two target azimuths that is closer to the third azimuth is determined as the azimuth included in the first preset position. If the third elevation included in the first position is between two target elevations, one of the two target elevations may be determined, according to a preset rule, as the elevation included in the first preset position. For example, the preset rule is as follows: If the third elevation included in the first position is between the two target elevations, a target elevation in the two target elevations that is closer to the third elevation is determined as the elevation included in the first preset position. If the third distance included in the first position is between two target distances, one of the two target distances may be determined, according to a preset rule, as the distance included in the first preset position. For example, the preset rule is as follows: If the third distance included in the first position is between the two target distances, a target distance in the two target distances that is closer to the third distance is determined as the distance included in the first preset position.

For example, if in the first position, obtained through measurement in step S201, of the mth first virtual speaker relative to the left ear position, the third azimuth is 88°, the third elevation is 46°, and the third distance is 1.02 m, the correspondences, measured in advance, between the plurality of preset positions and the plurality of HRTFs centered at the left ear position include an HRTF that is centered at the left ear position and that corresponds to a position (90°, 45°, 1 m), an HRTF that is centered at the left ear position and that corresponds to a position (85°, 45°, 1 m), an HRTF that is centered at the left ear position and that corresponds to a position (90°, 50°, 1 m), an HRTF that is centered at the left ear position and that corresponds to a position (85°, 50°, 1 m), an HRTF that is centered at the left ear position and that corresponds to a position (90°, 45°, 1.1 m), an HRTF that is centered at the left ear position and that corresponds to a position (85°, 45°, 1.1 m), an HRTF that is centered at the left ear position and that corresponds to a position (90°, 50°, 1.1 m), and an HRTF that is centered at the left ear position and that corresponds to a position (85°, 50°, 1.1 m). 88° is between 85° and 90°, but is closer to 90°, 46° is between 45° and 50°, but is closer to 45°, and 1.02 m is between 1 m and 1.1 m, but is closer to 1 m. Therefore, it is determined that the position (90°, 45°, 1 m) is a first preset position m associated with the first position of the mth first virtual speaker relative to the left ear position.

After the M first preset positions associated with the M first positions are determined, it is determined that the M HRTFs that are centered at the left ear position and that correspond to the M first preset positions are the M first HRTFs. For example, in the foregoing examples, based on the first correspondences, the HRTF that is centered at the left ear position and that corresponds to the first preset position m (90°, 45°, 1 m) is an HRTF corresponding to the first position of the mth first virtual speaker relative to the current left ear position. In other words, based on the first correspondences, the HRTF that is centered at the left ear position and that corresponds to the first preset position m (90°, 45°, 1 m) is an mth first HRTF or one first HRTF in the M first HRTFs.

In this embodiment, the obtained M first HRTFs corresponding to M virtual speakers are M HRTFs that are centered at the left ear position and that are obtained through actual measurement. The M first HRTFs can best represent HRTFs to which M first audio signals correspond when the M first audio signals are transmitted to the current left ear position. In this way, a signal that is transmitted to the left ear position is optimal.

Figure 8:
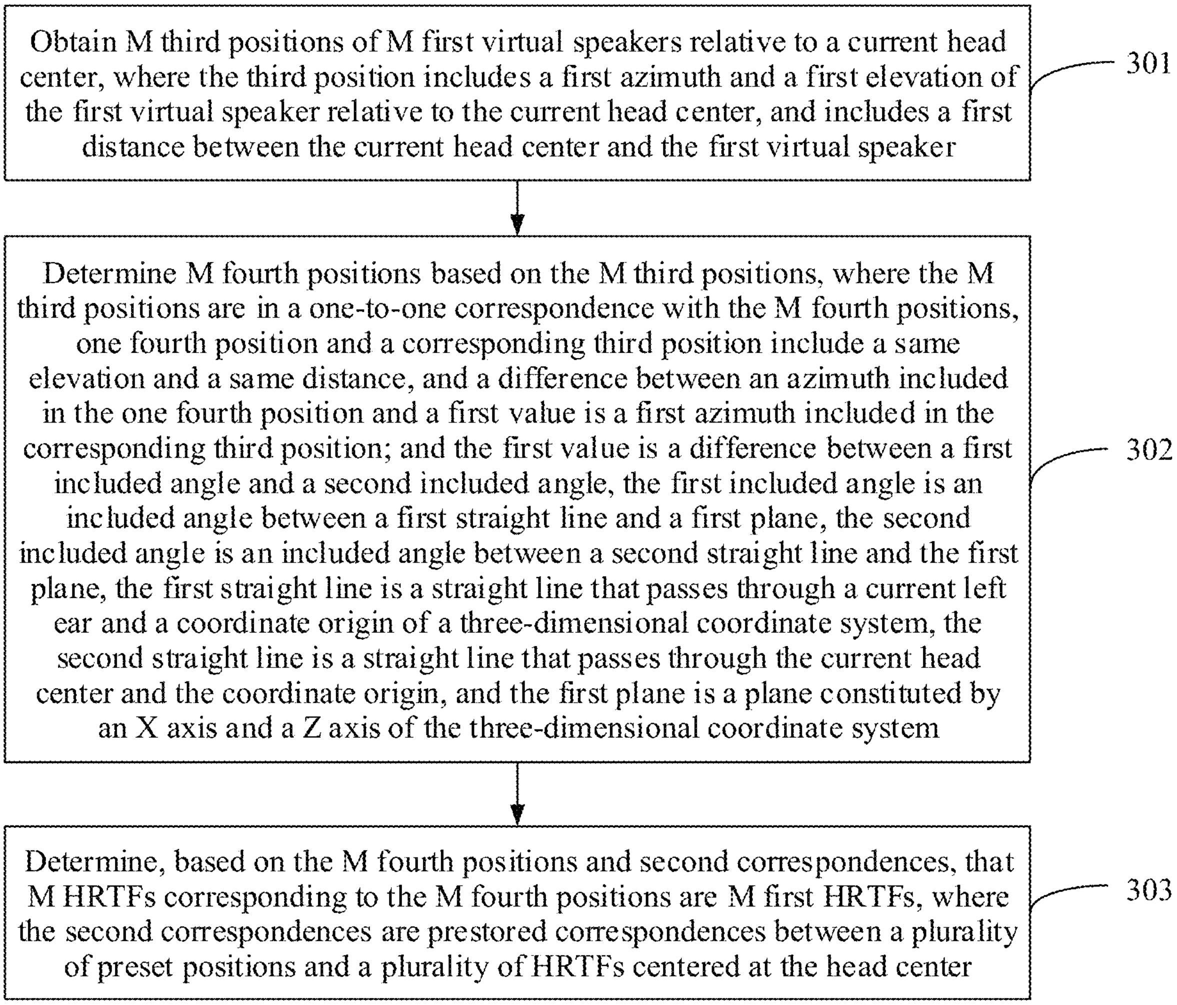
FIG. 8 is a flowchart of an audio processing method according to an embodiment of the present disclosure.

Next, a second method for obtaining M first HRTFs in step S102 in the embodiment shown in FIG. 4 is described. FIG. 8 is a flowchart 3 of an audio processing method according to an embodiment of the present disclosure. Referring to FIG. 8, the method in this embodiment includes the following steps.

Step S301: Obtain M third positions of M first virtual speakers relative to a current head center, where the third position includes a first azimuth and a first elevation of the first virtual speaker relative to the current head center, and includes a first distance between the current head center and the first virtual speaker.

Step S302: Determine M fourth positions based on the M third positions, where the M third positions are in a one-to-one correspondence with the M fourth positions, one fourth position and a corresponding third position include a same elevation and a same distance, and a difference between an azimuth included in the one fourth position and a first value is a first azimuth included in the corresponding third position; and the first value is a difference between a first included angle and a second included angle, the first included angle is an included angle between a first straight line and a first plane, the second included angle is an included angle between a second straight line and the first plane, the first straight line is a straight line that passes through a current left ear and a coordinate origin of a three-dimensional coordinate system, the second straight line is a straight line that passes through the current head center and the coordinate origin, and the first plane is a plane constituted by an X axis and a Z axis of the three-dimensional coordinate system.

Step S303: Determine, based on the M fourth positions and second correspondences, that M HRTFs corresponding to the M fourth positions are the M first HRTFs, where the second correspondences are prestored correspondences between a plurality of preset positions and a plurality of HRTFs centered at the head center.

For example, in step S301, a third position of each first virtual speaker relative to the current head center is obtained. If there are M first virtual speakers, M third positions are obtained. The current head center is the head center of a current listener.

Each third position includes a first azimuth and a first elevation of the first virtual speaker relative to the current head center, and includes a first distance between the current head center and the first virtual speaker.

In step S302, for each third position, a second elevation included in the third position is used as an elevation included in a corresponding fourth position, a second distance included in the third position is used as a distance included in the corresponding fourth position, and a second azimuth included in the third position plus the first value is an azimuth included in the corresponding fourth position. For example, if the third position is (52°, 73°, 0.5 m), and the first value is 6°, the fourth position is (58°, 73°, 0.5 m).

The three-dimensional coordinate system in this embodiment is the three-dimensional coordinate system corresponding to the foregoing audio signal receive end.

In step S303, before step S303, correspondences between a plurality of preset positions and a plurality of HRTFs centered at the head center need to be obtained in advance. For a method for obtaining the correspondences between a plurality of preset positions and a plurality of HRTFs centered at the head center, refer to the descriptions in the embodiment shown in FIG. 4. Details are not described again in this embodiment.

The determining, based on the M fourth positions and second correspondences, that M HRTFs corresponding to the M fourth positions are the M first HRTFs, where the second correspondences are prestored correspondences between a plurality of preset positions and a plurality of HRTFs centered at the head center includes: determining, based on the M fourth positions, M second preset positions associated with the M fourth positions, where the M second preset positions are preset positions in the prestored second correspondences; and determining, based on the second correspondences, that HRTFs that are centered at the head center and that correspond to the M second preset positions are the M first HRTFs.

For example, the second preset position associated with the fourth position may be the fourth position; or an elevation included in the second preset position is a target elevation that is closest to an elevation included in the fourth position, an azimuth included in the second preset position is a target azimuth that is closest to an azimuth included in the fourth position, and a distance included in the second preset position is a target distance that is closest to a distance included in the fourth position. The target azimuth is an azimuth included in a corresponding preset position during measurement of the HRTF centered at the head center, namely, an azimuth of a placed first sound source relative to the head center during measurement of the HRTF centered at the head center. The target elevation is an elevation in a corresponding preset position during measurement of the HRTF centered at the head center, namely, an elevation of the placed first sound source relative to the head center during measurement of the HRTF centered at the head center. The target distance is a distance in a corresponding preset position during measurement of the HRTF centered at the head center, namely, a distance between the placed first sound source and the head center during measurement of the HRTF centered at the head center. In other words, all the second preset positions are positions at which first sound sources are placed during measurement of the plurality of HRTFs centered at the head center. In other words, an HRTF that is centered at the head center and that corresponds to each second preset position is measured in advance.

It may be understood that, if the azimuth included in the fourth position is between two target azimuths, for a method for determining the azimuth included in the second preset position, refer to the descriptions about the first preset position associated with the first position. If the elevation included in the fourth position is between two target elevations, for a method for determining the elevation included in the second preset position, refer to the descriptions about the first preset position associated with the first position. If the elevation included in the fourth position is between two target elevations, for a method for determining the elevation included in the second preset position, refer to the descriptions about the first preset position associated with the first position. Details are not described herein again.

After the M second preset positions associated with the M fourth positions are determined, it is determined that the HRTFs that are centered at the head center and that correspond to the M second preset positions are the M first HRTFs. For example, if a second preset position associated with a fourth position is (30°, 60°, 0.5 m), based on the second correspondences, an HRTF corresponding to the position (30°, 60°, 0.5 m) is an HRTF that is centered at the head center and that corresponds to the fourth position. In other words, based on the second correspondences, the HRTF that is centered at the head center and that corresponds to the position (30°, 60°, 0.5 m) is one first HRTF in the M first HRTFs.

In this embodiment, the M first HRTFs are converted from HRTFs centered at the head center, and efficiency of obtaining the first HRTFs is comparatively high.

Figure 9:
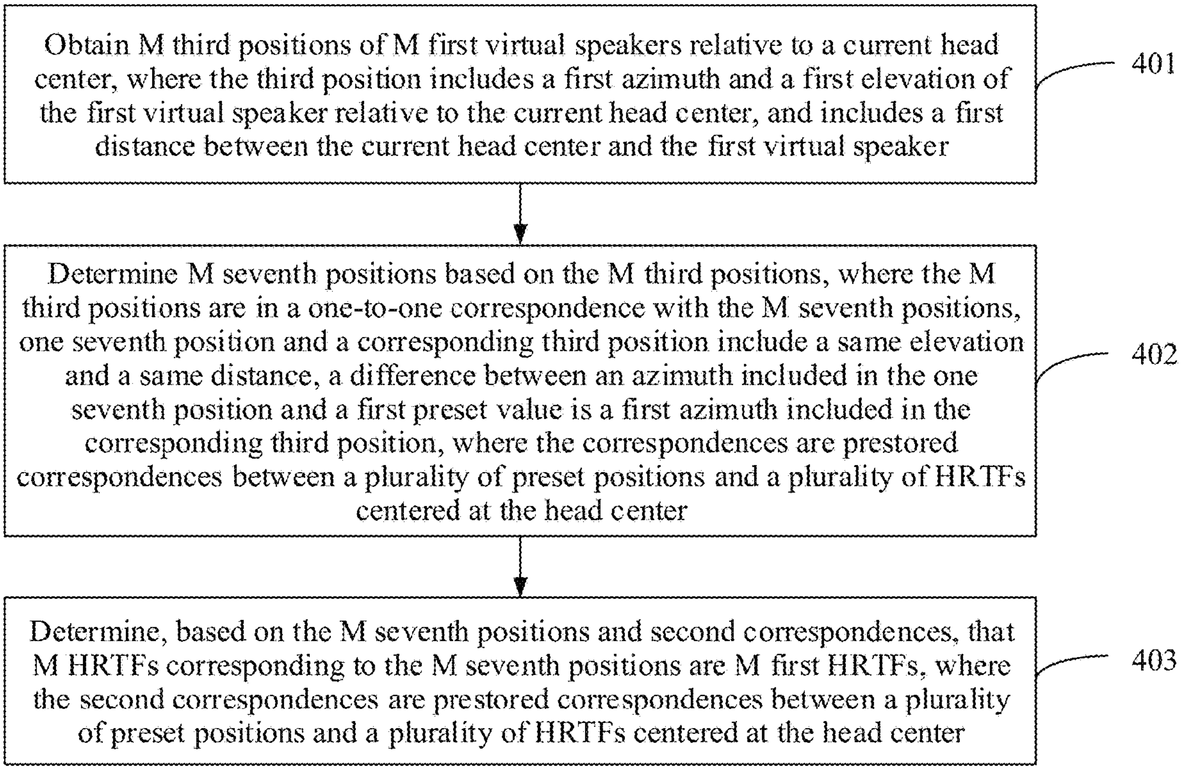
FIG. 9 is a flowchart of an audio processing method according to an embodiment of the present disclosure.

Next, a third method for obtaining M first HRTFs in step S102 in the embodiment shown in FIG. 4 is described. FIG. 9 is a flowchart 4 of an audio processing method according to an embodiment of the present disclosure. Referring to FIG. 9, the method in this embodiment includes the following steps.

Step S401: Obtain M third positions of M first virtual speakers relative to a current head center, where the third position includes a first azimuth and a first elevation of the first virtual speaker relative to the current head center, and includes a first distance between the current head center and the first virtual speaker.

Step S402: Determine M seventh positions based on the M third positions, where the M third positions are in a one-to-one correspondence with the M seventh positions, one seventh position and a corresponding third position include a same elevation and a same distance, a difference between an azimuth included in the one seventh position and a first preset value is a first azimuth included in the corresponding third position, where the correspondences are prestored correspondences between a plurality of preset positions and a plurality of HRTFs centered at the head center.

Step S403: Determine, based on the M seventh positions and second correspondences, that M HRTFs corresponding to the M seventh positions are the M first HRTFs, where the second correspondences are prestored correspondences between a plurality of preset positions and a plurality of HRTFs centered at the head center.

For step S401 in this embodiment, refer to step S301 in the embodiment shown in FIG. 8. Details are not described herein again.

In step S402, a three-dimensional coordinate system in this embodiment is the three-dimensional coordinate system corresponding to the foregoing audio signal receive end.

For each third position, a second elevation included in the third position is used as an elevation included in a corresponding seventh position, a second distance included in the third position is used as a distance included in the corresponding seventh position, and a second azimuth included in the third position plus the first preset value is an azimuth included in the corresponding seventh position. For example, if the third position is (52°, 73°, 0.5 m), and the first preset value is 5°, the seventh position is (57°, 73°, 0.5 m).

The first preset value is a preset value without consideration of a size of the head of a listener. In the foregoing embodiment, the first value is the difference between the first included angle and the second included angle, and this considers a size of the head of a current listener. Optionally, the first preset value is the same as the first preset angle in the embodiment shown in FIG. 4.

In step S403, before step S403, correspondences between a plurality of preset positions and a plurality of HRTFs centered at the head center need to be obtained in advance. For a method for obtaining the correspondences between a plurality of preset positions and a plurality of HRTFs centered at the head center, refer to the descriptions in the embodiment shown in FIG. 4. Details are not described again in this embodiment.

The determining, based on the M seventh positions and second correspondences, that M HRTFs corresponding to the M seventh positions are the M first HRTFs, where the second correspondences are prestored correspondences between a plurality of preset positions and a plurality of HRTFs centered at the head center includes: determining, based on the M seventh positions, M third preset positions associated with the M seventh positions, where the M third preset positions are preset positions in the second correspondences; and determining, based on the second correspondences, that HRTFs that are centered at the head center and that correspond to the M third preset positions are the M first HRTFs.

For the third preset position associated with the seventh position, refer to the explanation of the first preset position associated with the first position in the embodiment shown in FIG. 6. Details are not described herein again.

After the M third preset positions associated with the M seventh positions are determined, it is determined that the HRTFs that are centered at the head center and that correspond to the M third preset positions are the M first HRTFs. For example, if a third preset position associated with a seventh position is (35°, 60°, 0.5 m), based on the second correspondences, an HRTF that is centered at the head center and that corresponds to the position (35°, 60°, 0.5 m) is an HRTF that is centered at the head center and that corresponds to the seventh position. In other words, based on the second correspondences, the HRTF that is centered at the head center and that corresponds to the position (35°, 60°, 0.5 m) is one of the first HRTFs.

In this embodiment, the M first HRTFs are converted from HRTFs centered at the head center, and during obtaining of the foregoing fourth positions, a size of the head of the current listener is not considered. This further improves efficiency of obtaining the first HRTFs.

Figure 10:
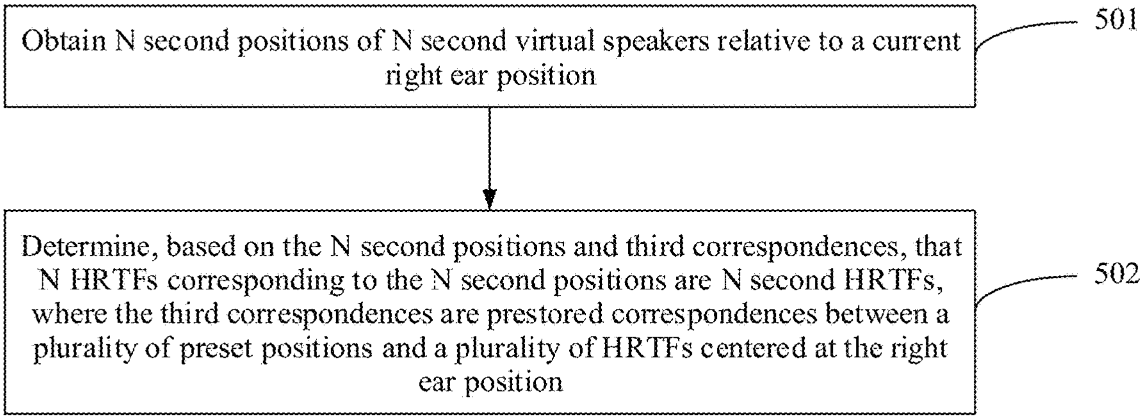
FIG. 10 is a flowchart of an audio processing method according to an embodiment of the present disclosure.

Next, a first process of obtaining N second HRTFs in step S102 in the embodiment shown in FIG. 4 is described. FIG. 10 is a flowchart 5 of an audio processing method according to an embodiment of the present disclosure. Referring to FIG. 10, the method in this embodiment includes the following steps.

Step S501: Obtain N second positions of N second virtual speakers relative to a current right ear position.

Step S502: Determine, based on the N second positions and third correspondences, that N HRTFs corresponding to the N second positions are the N second HRTFs, where the third correspondences are prestored correspondences between a plurality of preset positions and a plurality of HRTFs centered at the right ear position.

For example, in step S501, a second position of each second virtual speaker relative to a right ear position of a listener is obtained. If there are N second virtual speakers, N second positions are obtained.

Each second position includes a fourth elevation and a fourth azimuth of a corresponding second virtual speaker relative to the current right ear position, and includes a fourth distance between the second virtual speaker and the current right ear position. The current right ear position is the right ear of the current listener.

In step S502, before step S502, correspondences between a plurality of preset positions and a plurality of HRTFs centered at the right ear position need to be obtained in advance.

Figure 11:
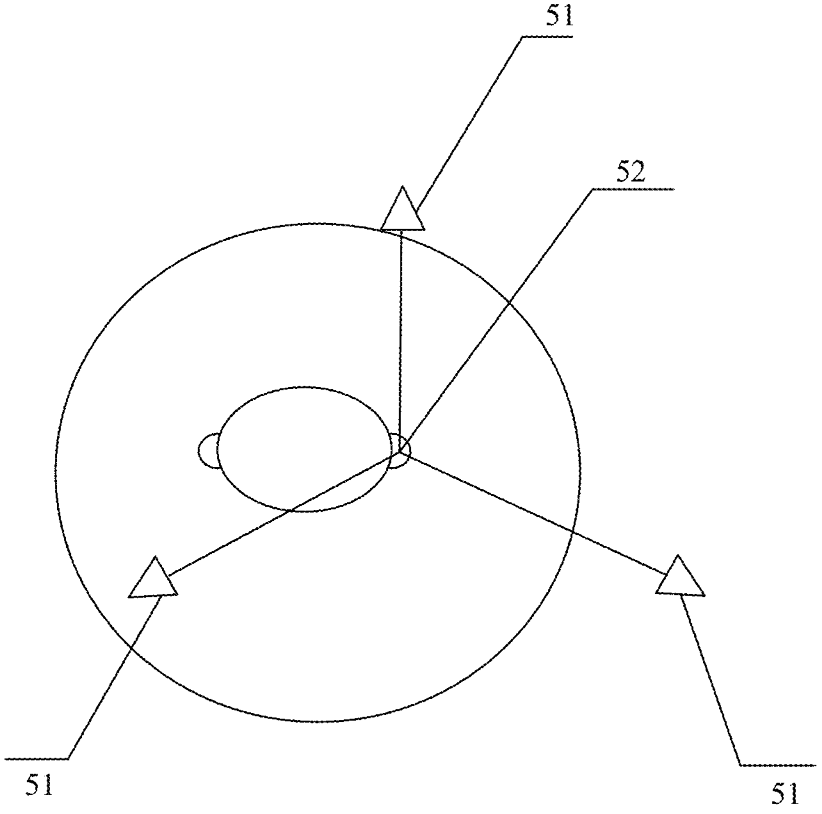
FIG. 11 is a diagram of a measurement scenario in which an HRTF is measured using a right ear position as a center according to an embodiment of the present disclosure.

FIG. 11 is a diagram of a measurement scenario in which an HRTF is measured using a right ear position as a center according to an embodiment of the present disclosure. FIG. 11 shows several positions 51 relative to a right ear position 52. It may be understood that there are a plurality of HRTFs centered at the right ear position, and audio signals that are sent by third sound sources at different positions 51 correspond to different HRTFs when the audio signals are transmitted to the right ear position. When the HRTF centered at the right ear position is measured, the right ear position may be a current right ear position of a current listener, or may be a right ear position of another listener, or may be a right ear position of a virtual listener.

In this way, third sound sources are placed at different positions relative to the right ear position 52, to obtain HRTFs that are centered at the right ear position and that correspond to the plurality of positions 51. To be more specific, if a position of a third sound source 1 relative to the right ear position 52 is a position c, an HRTF that is used to transmit, to the right ear position 52, a signal sent by the third sound source 1 and that is obtained through measurement is an HRTF 1 that is centered at the right ear position 52 and that corresponds to the position c; if a position of a third sound source 2 relative to the right ear position 52 is a position d, an HRTF that is used to transmit, to the right ear position 52, a signal sent by the third sound source 2 and that is obtained through measurement is an HRTF 2 that is centered at the right ear position 52 and that corresponds to the position d; and so on. The position c includes an azimuth 1, an elevation 1, and a distance 1. The azimuth 1 is an azimuth of the third sound source 1 relative to the right ear position 52. The elevation 1 is an elevation of the third sound source 1 relative to the right ear position 52. The distance 1 is a distance between the third sound source 1 and the right ear position 52. Likewise, the position d includes an azimuth 2, an elevation 2, and a distance 2. The azimuth 2 is an azimuth of the third sound source 2 relative to the right ear position 52. The elevation 2 is an elevation of the third sound source 2 relative to the right ear position 52. The distance 2 is a distance between the third sound source 2 and the right ear position 52.

It may be understood that, during setting positions of the third sound sources relative to the right ear position 52, when distances and elevations do not change, azimuths of adjacent third sound sources may be spaced by a first preset angle; when distances and azimuths do not change, elevations of adjacent third sound sources may be spaced by a second preset angle; and when elevations and azimuths do not change, distances between adjacent third sound sources may be spaced by a first preset distance. The first preset angle may be any one of 3° to 10°, for example, 5°. The second preset angle may be any one of 3° to 10°, for example, 5°. The first preset distance may be any one of 0.05 m to 0.2 m, for example, 0.1 m.

For example, a process of obtaining the HRTF 1 that is centered at the right ear position and that corresponds to the position c (100°, 50°, 1 m) is as follows: The third sound source 1 is placed at a position at which an azimuth relative to the right ear position is 100°, an elevation relative to the right ear position is 50°, and a distance from the right ear position is 1 m; and a corresponding HRTF that is used to transmit, to the right ear position, an audio signal sent by the third sound source 1 is measured, in order to obtain the HRTF 1 centered at the right ear position.

For another example, a process of obtaining the HRTF 2 that is centered at the right ear position and that corresponds to the position d (100°, 45°, 1 m) is as follows: The third sound source 2 is placed at a position at which an azimuth relative to the right ear position is 100°, an elevation relative to the right ear position is 45°, and a distance from the right ear position is 1 m; and a corresponding HRTF that is used to transmit, to the right ear position, an audio signal sent by the third sound source 2 is measured, in order to obtain the HRTF 2 centered at the right ear position.

For another example, a process of obtaining an HRTF 3 that is centered at the right ear position and that corresponds to a position e (95°, 50°, 1 m) is as follows: A third sound source 3 is placed at a position at which an azimuth relative to the right ear position is 95°, an elevation relative to the right ear position is 50°, and a distance from the right ear position is 1 m; and a corresponding HRTF that is used to transmit, to the right ear position, an audio signal sent by the third sound source 3 is measured, in order to obtain the HRTF 3 centered at the right ear position.

For another example, a process of obtaining an HRTF 4 that is centered at the right ear position and that corresponds to a position f (95°, 45°, 1 m) is as follows: A third sound source 4 is placed at a position at which an azimuth relative to the right ear position is 95°, an elevation relative to the right ear position is 45°, and a distance from the right ear position is 1 m; and a corresponding HRTF that is used to transmit, to the right ear position, an audio signal sent by the third sound source 4 is measured, in order to obtain the HRTF 4 centered at the right ear position.

For another example, a process of obtaining an HRTF 5 that is centered at the right ear position and that corresponds to a position g (100°, 50°, 1.2 m) is as follows: A third sound source 5 is placed at a position at which an azimuth relative to the right ear position is 100°, an elevation relative to the right ear position is 50°, and a distance from the right ear position is 1.2 m; and a corresponding HRTF that is used to transmit, to the right ear position, an audio signal sent by the third sound source 5 is measured, in order to obtain the HRTF 5 centered at the right ear position.

For another example, a process of obtaining an HRTF 6 that is centered at the right ear position and that corresponds to a position h (95°, 50°, 1.1 m) is as follows: A third sound source 6 is placed at a position at which an azimuth relative to the right ear position is 95°, an elevation relative to the right ear position is 50°, and a distance from the right ear position is 1.1 m; and a corresponding HRTF that is used to transmit, to the right ear position, an audio signal sent by the third sound source 6 is measured, in order to obtain the HRTF 6 centered at the right ear position.

It may be understood that, an azimuth ranges from −180° to 180°, and an elevation ranges from −90° to 90°. In this case, if the first preset angle is 5°, the second preset angle is 5°, the first preset distance is 0.1 m, and a total distance is 2 m, 72×36×21 HRTFs centered at the right ear position may be obtained.

According to the foregoing method, correspondences between a plurality of positions and a plurality of HRTFs centered at the right ear position may be obtained through measurement. It may be understood that, during measurement of the HRTFs centered at the right ear position, the plurality of positions at which the third sound sources are placed may be referred to as preset positions. Therefore, according to the foregoing method, the correspondences between the plurality of preset positions and the plurality of HRTFs centered at the right ear position may be obtained through measurement. The correspondences are referred to as third correspondences, and the third correspondences may be stored in the memory 22 shown in FIG. 3.

Then, the determining, based on the N second positions and third correspondences, that N HRTFs corresponding to the N second positions are the N second HRTFs, where the third correspondences are prestored correspondences between a plurality of preset positions and a plurality of HRTFs centered at the right ear position includes: determining N fourth preset positions associated with the N second positions; and determining, based on the third correspondences, that N HRTFs that are centered at the right ear position and that correspond to the N fourth preset positions are the N second HRTFs.

The fourth preset position associated with the second position may be the second position; or an elevation included in the fourth preset position is a target elevation that is closest to a fourth elevation included in the second position, an azimuth included in the fourth preset position is a target azimuth that is closest to a fourth azimuth included in the second position, and a distance included in the fourth preset position is a target distance that is closest to a fourth distance included in the second position. The target azimuth is an azimuth included in a corresponding preset position during measurement of the HRTF centered at the right ear position, namely, an azimuth of the placed third sound source relative to the right ear position during measurement of the HRTF centered at the right ear position. The target elevation is an elevation included in a corresponding preset position during measurement of the HRTF centered at the right ear position, namely, an elevation of the placed third sound source relative to the right ear position during measurement of the HRTF centered at the right ear position. The target distance is a distance included in a corresponding preset position during measurement of the HRTF centered at the right ear position, namely, a distance between the placed third sound source and the right ear position during measurement of the HRTF centered at the right ear position. In other words, all the fourth preset positions are positions at which the third sound sources are placed during measurement of the plurality of HRTFs. In other words, an HRTF that is centered at the right ear position and that corresponds to each fourth preset position is measured in advance.

It may be understood that, if the fourth azimuth included in the second position is between two target azimuths, for a method for determining the azimuth included in the fourth preset position, refer to the descriptions about the first preset position associated with the first position. If the fourth elevation included in the second position is between two target elevations, for a method for determining the elevation included in the fourth preset position, refer to the descriptions about the first preset position associated with the first position. If the fourth elevation included in the second position is between two target elevations, for a method for determining the elevation included in the fourth preset position, refer to the descriptions about the first preset position associated with the first position. Details are not described herein again.

For example, if in the second position, obtained through measurement in step S501, of an nth second virtual speaker relative to the right ear position, the fourth azimuth is 88°, the fourth elevation is 46°, and the fourth distance is 1.02 m, the correspondences between the plurality of preset positions and the plurality of HRTFs centered at the right ear position include an HRTF that is centered at the right ear position and that corresponds to a position (90°, 45°, 1 m), an HRTF that is centered at the right ear position and that corresponds to a position (85°, 45°, 1 m), an HRTF that is centered at the right ear position and that corresponds to a position (90°, 50°, 1 m), an HRTF that is centered at the right ear position and that corresponds to a position (85°, 50°, 1 m), an HRTF that is centered at the right ear position and that corresponds to a position (90°, 45°, 1.1 m), an HRTF that is centered at the right ear position and that corresponds to a position (85°, 45°, 1.1 m), an HRTF that is centered at the right ear position and that corresponds to a position (90°, 50°, 1.1 m), and an HRTF that is centered at the right ear position and that corresponds to a position (85°, 50°, 1.1 m). 88° is between 85° and 90°, but is closer to 90°, 46° is between 45° and 50°, but is closer to 45°, and 1.02 m is between 1 m and 1.1 m, but is closer to 1 m. Therefore, it is determined that the position (90°, 45°, 1 m) is a fourth preset position n associated with the second position of the nth second virtual speaker relative to the right ear position.

After the N fourth preset positions associated with the N second positions are determined, it is determined that the N HRTFs that are centered at the right ear position and that correspond to the N fourth preset positions are the N second HRTFs. For example, in the foregoing examples, based on the third correspondences, the HRTF that is centered at the right ear position and that corresponds to the position (90°, 45°, 1 m) is an HRTF that is centered at the right ear position and that corresponds to the second position of the nth second virtual speaker relative to the right ear position. In other words, based on the third correspondences, the HRTF that is centered at the right ear position and that corresponds to the fourth preset position n (90°, 45°, 1 m) is an nth second HRTF, or a second HRTF corresponding to the nth second virtual speaker.

In this embodiment, the N second HRTFs are N HRTFs that are centered at the right ear position and that are obtained through actual measurement. The obtained N second HRTFs can best represent HRTFs to which N second audio signals correspond when the N second audio signals are transmitted to the current right ear position of the listener. In this way, a signal that is transmitted to the right ear position is optimal.

Figure 12:
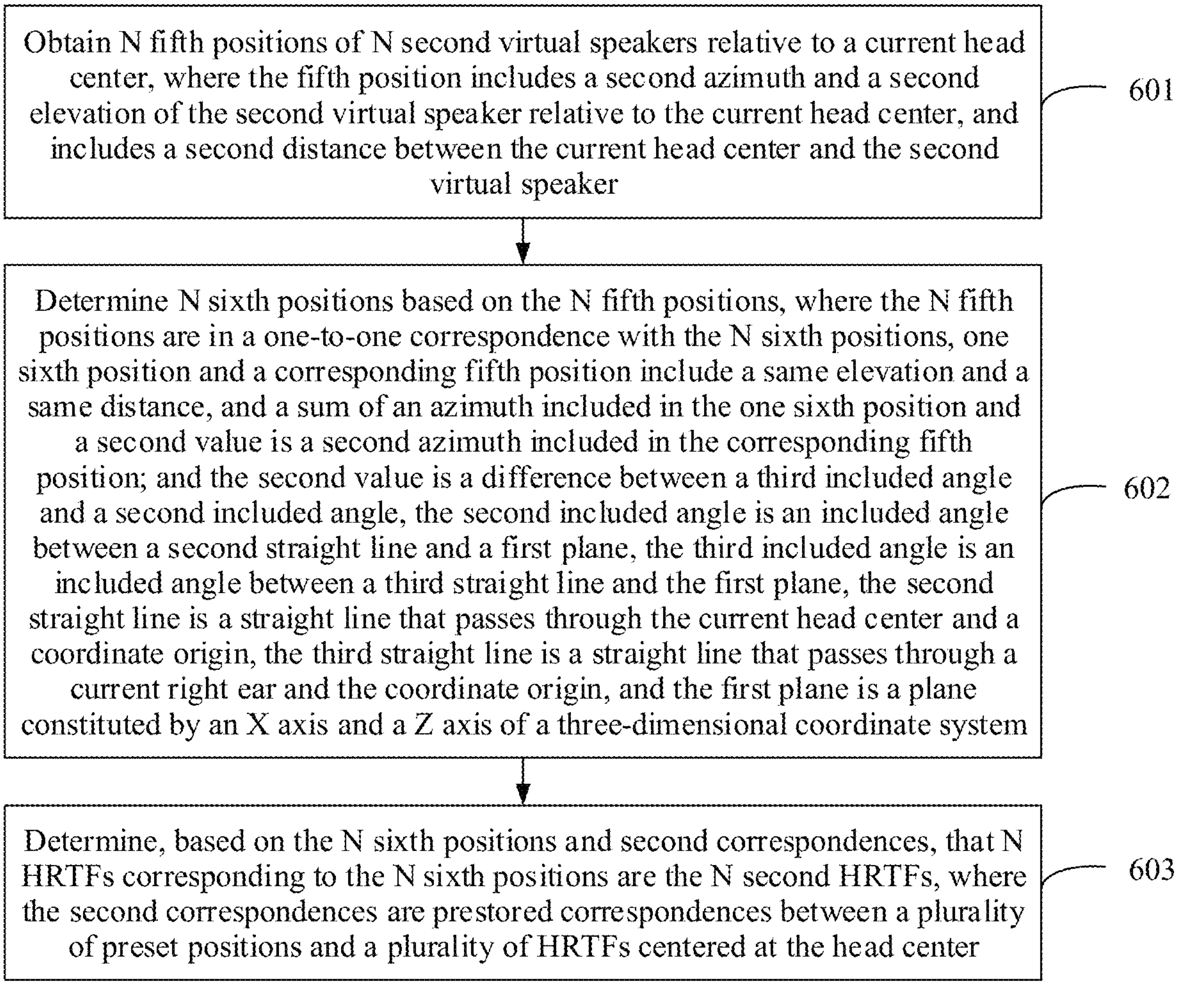
FIG. 12 is a flowchart of an audio processing method according to an embodiment of the present disclosure.

Next, a second process of obtaining N second HRTFs in step S102 in the embodiment shown in FIG. 4 is described. FIG. 12 is a flowchart 6 of an audio processing method according to an embodiment of the present disclosure. Referring to FIG. 12, the method in this embodiment includes the following steps.

Step S601: Obtain N fifth positions of N second virtual speakers relative to a current head center, where the fifth position includes a second azimuth and a second elevation of the second virtual speaker relative to the current head center, and includes a second distance between the current head center and the second virtual speaker.

Step S602: Determine N sixth positions based on the N fifth positions, where the N fifth positions are in a one-to-one correspondence with the N sixth positions, one sixth position and a corresponding fifth position include a same elevation and a same distance, and a sum of an azimuth included in the one sixth position and a second value is a second azimuth included in the corresponding fifth position; and the second value is a difference between a third included angle and a second included angle, the second included angle is an included angle between a second straight line and a first plane, the third included angle is an included angle between a third straight line and the first plane, the second straight line is a straight line that passes through the current head center and a coordinate origin, the third straight line is a straight line that passes through a current right ear and the coordinate origin, and the first plane is a plane constituted by an X axis and a Z axis of a three-dimensional coordinate system.

Step S603: Determine, based on the N sixth positions and second correspondences, that N HRTFs corresponding to the N sixth positions are the N second HRTFs, where the second correspondences are prestored correspondences between a plurality of preset positions and a plurality of HRTFs centered at the head center.

For example, in the step S601, a fifth position of each second virtual speaker relative to the head center of a listener is obtained. If there are N second virtual speakers, N fifth positions are obtained. The current head center is the head center of a current listener.

Each fifth position includes a second elevation and a second azimuth of a corresponding second virtual speaker relative to the current head center, and includes a second distance between the second virtual speaker and the current head center.

In step S602, for each fifth position, a second elevation included in the fifth position is used as an elevation included in a corresponding sixth position, a second distance included in the fifth position is used as a distance included in the corresponding sixth position, and a second azimuth included in the fifth position minus the second value is an azimuth included in corresponding M sixth positions. For example, if the fifth position is (52°, 73°, 0.5 m), and the second value is 6°, the sixth position is (46°, 73°, 0.5 m).

The three-dimensional coordinate system in this embodiment is the three-dimensional coordinate system corresponding to the foregoing audio signal receive end.

In step S603, before step S603, correspondences between a plurality of preset positions and a plurality of HRTFs centered at the head center need to be obtained in advance. For a method for obtaining the correspondences between a plurality of preset positions and a plurality of HRTFs centered at the head center, refer to the descriptions in the embodiment shown in FIG. 4. Details are not described again in this embodiment.

The determining, based on the N sixth positions and second correspondences, that N HRTFs corresponding to the N sixth positions are the N second HRTFs, where the second correspondences are prestored correspondences between a plurality of preset positions and a plurality of HRTFs centered at the head center includes: determining N fifth preset positions based on the N sixth positions, where the N fifth preset positions are preset positions in the second correspondences; and determining, based on the second correspondences, that N HRTFs that are centered at the head center and that correspond to the N fifth preset positions are the N second HRTFs.

For the fifth preset position associated with the sixth position, refer to the explanation of the second preset position associated with the fourth position. Details are not described herein again.

After the N fifth preset positions associated with the N sixth positions are determined, it is determined that the N HRTFs that are centered at the head center and that correspond to the N fifth preset positions are the N second HRTFs. For example, if a fifth preset position associated with a sixth position is (40°, 60°, 0.5 m), based on the second correspondences, an HRTF that is centered at the head center and that corresponds to the position (40°, 60°, 0.5 m) is an HRTF that is centered at the head center and that corresponds to the sixth position. In other words, based on the second correspondences, the HRTF that is centered at the head center and that corresponds to the position (40°, 60°, 0.5 m) is one second HRTF in the N second HRTFs.

In this embodiment, the N second HRTFs are converted from HRTFs centered at the head center, and efficiency of obtaining the second HRTFs is comparatively high.

Next, a third process of obtaining N second HRTFs in step S102 in the embodiment shown in FIG. 4 is described. FIG.

Figure 13:
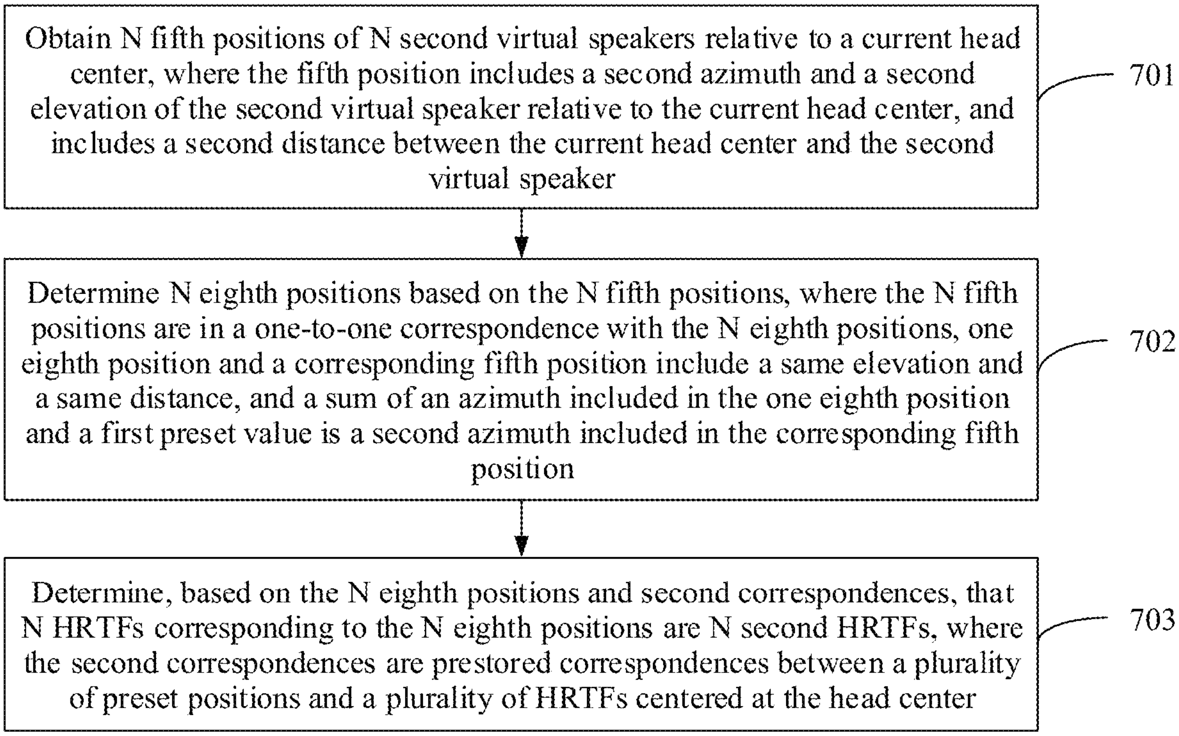
FIG. 13 is a flowchart of an audio processing method according to an embodiment of the present disclosure.

13 is a flowchart 7 of an audio processing method according to an embodiment of the present disclosure. Referring to FIG. 13, the method in this embodiment includes the following steps.

Step S701: Obtain N fifth positions of N second virtual speakers relative to a current head center, where the fifth position includes a second azimuth and a second elevation of the second virtual speaker relative to the current head center, and includes a second distance between the current head center and the second virtual speaker.

Step S702: Determine N eighth positions based on the N fifth positions, where the N fifth positions are in a one-to-one correspondence with the N eighth positions, one eighth position and a corresponding fifth position include a same elevation and a same distance, and a sum of an azimuth included in the one eighth position and a first preset value is a second azimuth included in the corresponding fifth position.

Step S703: Determine, based on the N eighth positions and second correspondences, that N HRTFs corresponding to the N eighth positions are the N second HRTFs, where the second correspondences are prestored correspondences between a plurality of preset positions and a plurality of HRTFs centered at the head center.

For step S701 in this embodiment, refer to step S601 in the embodiment in FIG. 12. Details are not described herein again.

In step S702, a three-dimensional coordinate system in this embodiment is the three-dimensional coordinate system corresponding to the foregoing audio signal receive end.

For each fifth position, a second elevation included in the fifth position is used as an elevation included in a corresponding eighth position, a second distance included in the fifth position is used as a distance included in the corresponding eighth position, and a second azimuth included in the fifth position minus the first preset value is an azimuth included in the corresponding eighth position. For example, if the fifth position is (52°, 73°, 0.5 m), and the first preset value is 5°, the eighth position is (47°, 73°, 0.5 m).

The first preset value is a preset value without consideration of a size of the head of a listener. In the foregoing embodiment, the second value is the difference between the third included angle and the second included angle, and this considers a size of the head of a current listener. Optionally, the first preset value is the same as the first preset angle in the embodiment shown in FIG. 6.

In step S703, before step S703, correspondences between a plurality of preset positions and a plurality of HRTFs centered at the head center need to be obtained in advance. For a method for obtaining the correspondences between a plurality of preset positions and a plurality of HRTFs centered at the head center, refer to the descriptions in the embodiment shown in FIG. 6. Details are not described again in this embodiment.

The determining, based on the N eighth positions and second correspondences, that N HRTFs corresponding to the N eighth positions are the N second HRTFs, where the second correspondences are prestored correspondences between a plurality of preset positions and a plurality of HRTFs centered at the head center includes: determining, based on the N eighth positions, N sixth preset positions associated with the N eighth positions, where the N sixth preset positions are preset positions in the second correspondences; and determining, based on the second correspondences, that HRTFs that are centered at the head center and that correspond to the N sixth preset positions are the N second HRTFs.

For the sixth preset position associated with the eighth position, refer to the explanation of the second preset position associated with the fourth position. Details are not described herein again.

After the N sixth preset positions associated with the N eighth positions are determined, it is determined that the HRTFs that are centered at the head center and that correspond to the N sixth preset positions are the N second HRTFs. For example, if a sixth preset position associated with an eighth position is (45°, 60°, 0.5 m), based on the second correspondences, an HRTF that is centered at the head center and that corresponds to the position (45°, 60°, 0.5 m) is an HRTF that is centered at the head center and that corresponds to the eighth position. In other words, based on the second correspondences, the HRTF that is centered at the head center and that corresponds to the position (45°, 60°, 0.5 m) is one of the second HRTFs.

In this embodiment, the N second HRTFs are converted from HRTFs centered at the head center, and during obtaining of the foregoing eighth positions, a size of the head of the current listener is not considered. This further improves efficiency of obtaining the second HRTFs.

A process of obtaining the M first HRTFs and a process of obtaining the N second HRTFs are described in the embodiments shown in FIG. 6 to FIG. 13. The method shown in any one of the embodiments in FIG. 6, FIG. 8, and FIG. 9 is used in combination with the method shown in any one of the embodiments in FIG. 10, FIG. 12, and FIG. 13.

Further, positions of the M first virtual speakers relative to the foregoing coordinate origin and positions of the N second virtual speakers relative to the foregoing coordinate origin may be obtained in the following manner. It may be understood that obtaining of the positions of the M first virtual speakers relative to the foregoing coordinate origin and obtaining of the positions of the N second virtual speakers relative to the foregoing coordinate origin are performed before step S101.

First, a method for obtaining the positions of the first virtual speakers relative to the foregoing coordinate origin is described.

Figure 14:
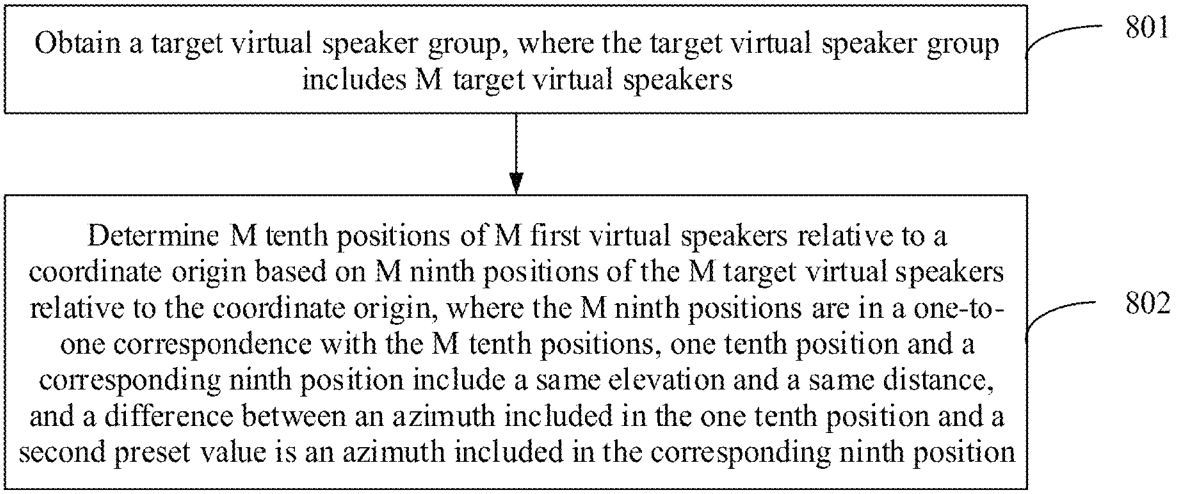
FIG. 14 is a flowchart of an audio processing method according to an embodiment of the present disclosure.

FIG. 14 is a flowchart 8 of an audio processing method according to an embodiment of the present disclosure. Referring to FIG. 14, the method in this embodiment includes the following steps.

Step S801: Obtain a target virtual speaker group, where the target virtual speaker group includes M target virtual speakers.

Step S802: Determine M tenth positions of M first virtual speakers relative to a coordinate origin based on M ninth positions of the M target virtual speakers relative to the coordinate origin, where the M ninth positions are in a one-to-one correspondence with the M tenth positions, one tenth position and a corresponding ninth position include a same elevation and a same distance, and a difference between an azimuth included in the one tenth position and a second preset value is an azimuth included in the corresponding ninth position.

For example, in step S801, an audio signal receive end performs rendering processing to obtain a target virtual speaker group, where the target virtual speaker group includes the M target virtual speakers.

In step S802, the determining M tenth positions of M first virtual speakers relative to a coordinate origin based on M ninth positions of the M target virtual speakers relative to the coordinate origin includes: for each ninth position, using an elevation included in the ninth position as an elevation of a corresponding tenth position, using a second distance included in the ninth position as a distance included in the corresponding tenth position, and using a sum of an azimuth included in the ninth position and the second preset value as an azimuth included in the corresponding tenth position.

For example, if the ninth position is (40°, 90°, 0.8 m), and the second preset value is 5°, the tenth position is (45°, 90°, 0.8 m).

It may be understood that, after the tenth positions of the first virtual speakers relative to the coordinate origin are obtained, according to Formula 1, M first audio signals may be obtained based on the M tenth positions of the first virtual speakers relative to the coordinate origin.

In other words, the obtaining M first audio signals by processing a to-be-processed audio signal by M first virtual speakers includes: processing the to-be-processed audio signal based on the M tenth positions of the M first virtual speakers relative to the coordinate origin, to obtain the M first audio signals.

Figure 15:
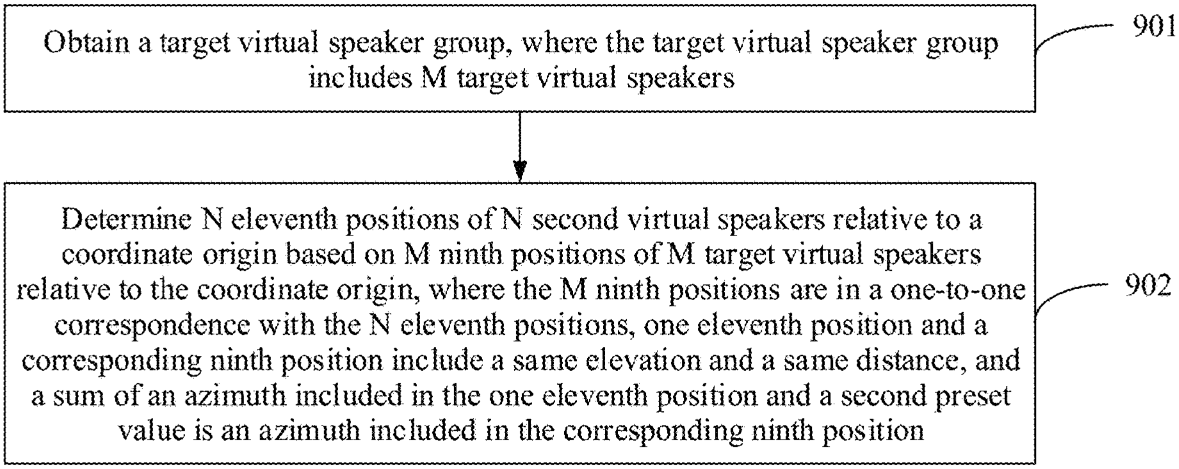
FIG. 15 is a flowchart of an audio processing method according to an embodiment of the present disclosure.

Next, a method for obtaining a position of a second virtual speaker relative to the foregoing coordinate origin is described. FIG. 15 is a flowchart 9 of an audio processing method according to an embodiment of the present disclosure. Referring to FIG. 15, the method in this embodiment includes the following steps.

Step S901: Obtain a target virtual speaker group, where the target virtual speaker group includes M target virtual speakers.

Step S902: Determine N eleventh positions of N second virtual speakers relative to the coordinate origin based on M ninth positions of the M target virtual speakers relative to the coordinate origin, where the M ninth positions are in a one-to-one correspondence with the N eleventh positions, one eleventh position and a corresponding ninth position include a same elevation and a same distance, and a sum of an azimuth included in the one eleventh position and a second preset value is an azimuth included in the corresponding ninth position.

For example, in step S901, an audio signal receiving end performs rendering processing to obtain a target virtual speaker group.

The target virtual speaker group includes M or N target virtual speakers, where M=N.

In step S902, the determining N eleventh positions of N second virtual speakers relative to the coordinate origin based on M ninth positions of the M target virtual speakers relative to the coordinate origin includes: for each ninth position, using an elevation included in the ninth position as an elevation of a corresponding eleventh position, using a second distance included in the ninth position as a distance included in the corresponding eleventh position, and using a difference between an azimuth included in the ninth position and the second preset value as an azimuth included in the corresponding eleventh position.

For example, if the ninth position is (40°, 90°, 0.8 m), and the second preset value is 5°, the eleventh position is (35°, 90°, 0.8 m).

It may be understood that, after the eleventh positions of the second virtual speakers relative to the coordinate origin are obtained, according to Formula 2, N second audio signals may be obtained based on the N eleventh positions of the second virtual speakers relative to the coordinate origin.

In other words, the obtaining N second audio signals by processing the to-be-processed audio signal by N second virtual speakers includes: processing the to-be-processed audio signal based on the N eleventh positions of the N second virtual speakers relative to the coordinate origin, to obtain the N second audio signals.

The following describes an effect of the audio processing method in the present disclosure in actual application.

Figure 16:
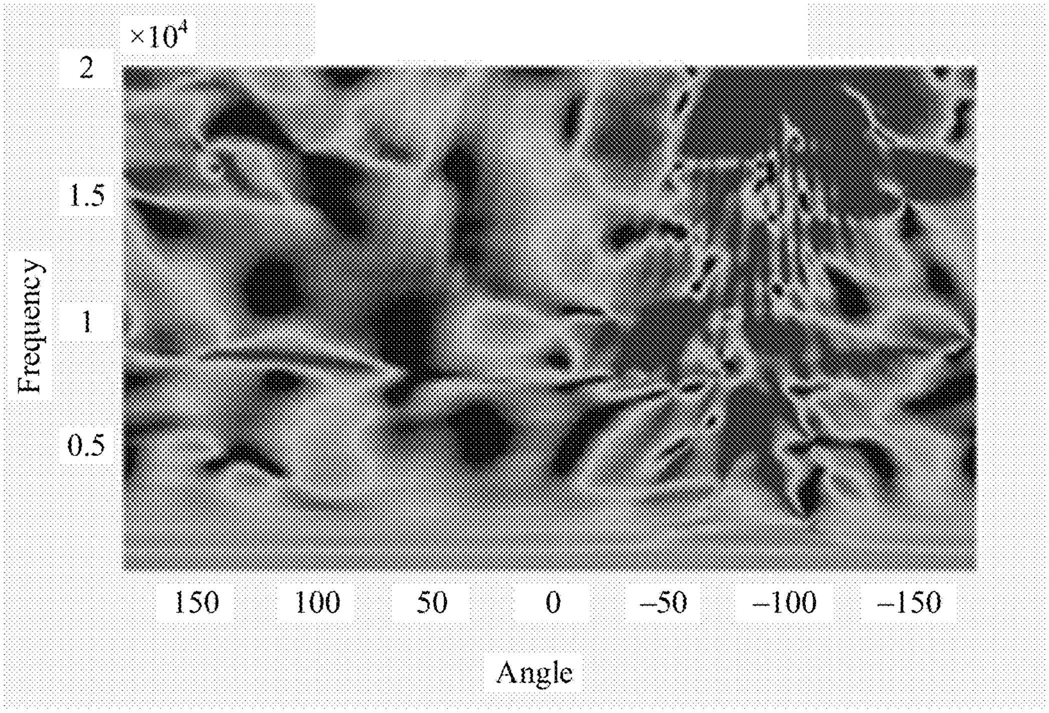
FIG. 16 is a spectrum diagram of a difference, in the conventional technology, between a rendering spectrum of a rendering signal corresponding to a left ear position and a theoretical spectrum corresponding to the left ear position.
Figure 17:
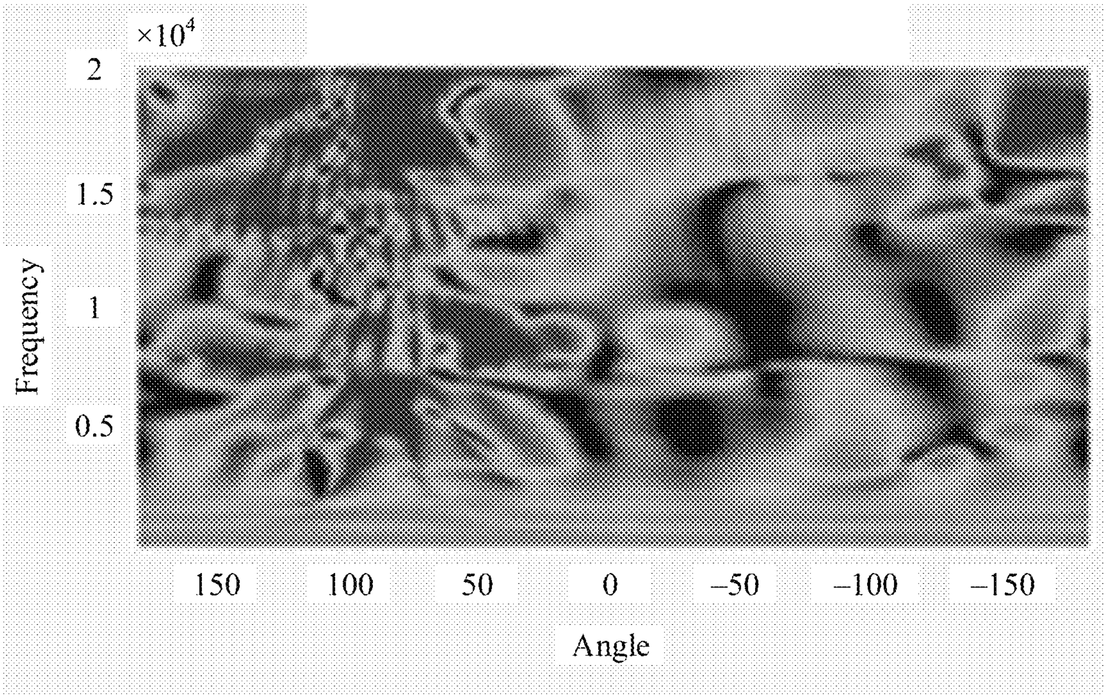
FIG. 17 is a spectrum diagram of a difference, in the conventional technology, between a rendering spectrum of a rendering signal corresponding to a right ear position and a theoretical spectrum corresponding to the right ear position.
Figure 18:
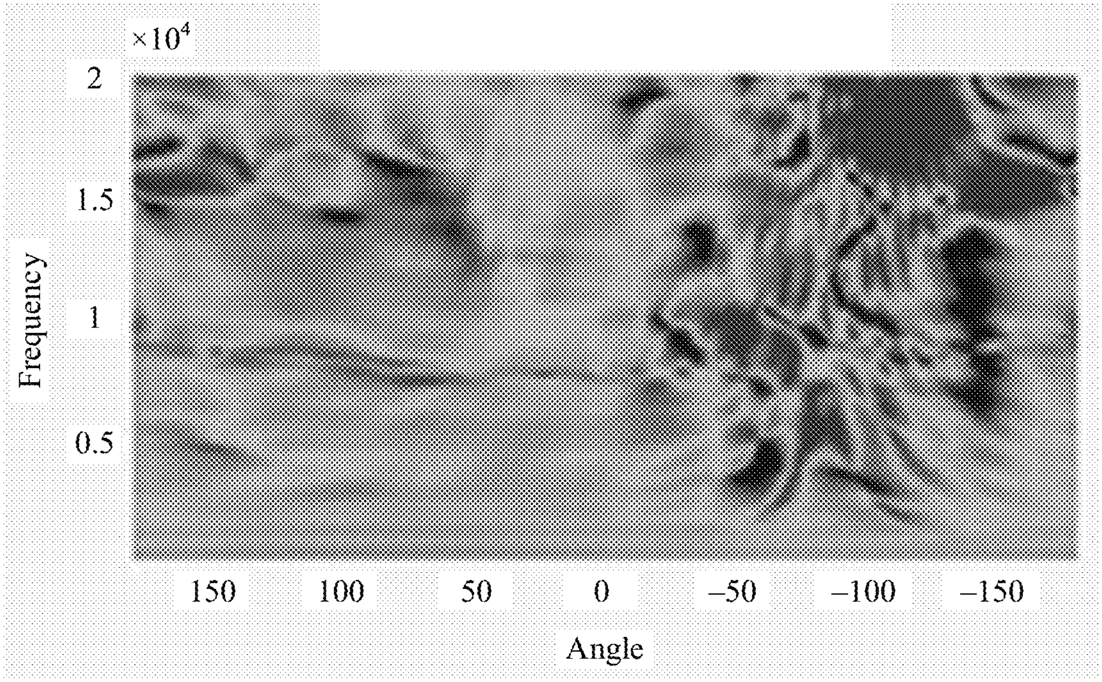
FIG. 18 is a spectrum diagram of a difference, in a method according to an embodiment of the present disclosure, between a rendering spectrum of a rendering signal corresponding to a left ear position and a theoretical spectrum corresponding to the left ear position.
Figure 19:
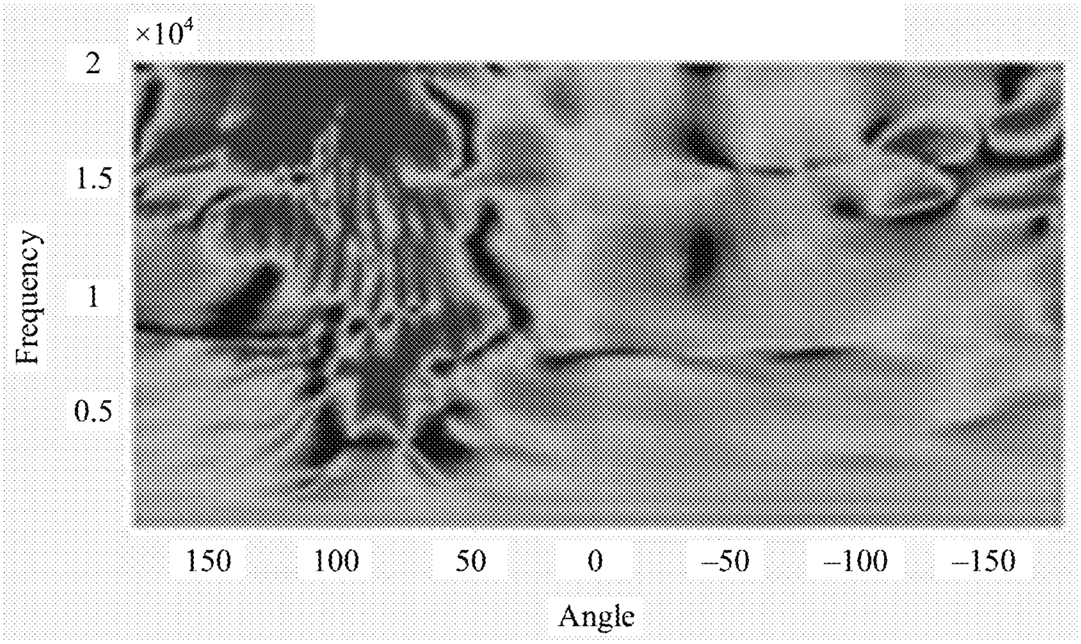
FIG. 19 is a spectrum diagram of a difference, in a method according to an embodiment of the present disclosure, between a rendering spectrum of a rendering signal corresponding to a right ear position and a theoretical spectrum corresponding to the right ear position.

FIG. 16 is a spectrum diagram of a difference, in the conventional technology, between a rendering spectrum of a rendering signal corresponding to a left ear position and a theoretical spectrum corresponding to the left ear position. FIG. 17 is a spectrum diagram of a difference, in the conventional technology, between a rendering spectrum of a rendering signal corresponding to a right ear position and a theoretical spectrum corresponding to the right ear position. FIG. 18 is a spectrum diagram of a difference, in a method according to an embodiment of the present disclosure, between a rendering spectrum of a rendering signal corresponding to a left ear position and a theoretical spectrum corresponding to the left ear position. FIG. 19 is a spectrum diagram of a difference, in a method according to an embodiment of the present disclosure, between a rendering spectrum of a rendering signal corresponding to a right ear position and a theoretical spectrum corresponding to the right ear position.

In FIG. 16 to FIG. 19, a lighter color indicates closer similarity between the rendering spectrum and the theoretical spectrum, and a deeper color indicates a larger difference between the rendering spectrum and the theoretical spectrum. It can be learned by comparing FIG. 16 and FIG. 18 that an area of a light-colored area in FIG. 18 is clearly larger than an area of a light-colored area in FIG. 16. This indicates that a signal that corresponds to the left ear position and that is obtained through rendering according to the method in this embodiment of the present disclosure is closer to a theoretical signal. In other words, a signal obtained through rendering has a better effect. It can be learned by comparing FIG. 17 and FIG. 19 that an area of a light-colored area in FIG. 19 is clearly larger than an area of a light-colored area in FIG. 17. This indicates that a signal that corresponds to the right ear position and that is obtained through rendering according to the method in this embodiment of the present disclosure is closer to a theoretical signal. In other words, a signal obtained through rendering has a better effect.

For functions implemented by an audio signal receive end, the foregoing describes the solutions provided in the embodiments of the present disclosure. It may be understood that, to implement the foregoing functions, the audio signal receive end includes corresponding hardware structures and/or software modules for performing the functions. With reference to units and algorithm steps in the examples described in the embodiments disclosed in the present disclosure, the embodiments of the present disclosure may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of the present disclosure.

In the embodiments of the present disclosure, the audio signal receive end may be divided into functional modules based on the foregoing method examples. For example, each function module may be obtained through division based on each corresponding function, or two or more functions may be integrated into one processing unit. The foregoing integrated unit may be implemented in a form of hardware, or may be implemented in a form of a software functional module. It should be noted that in the embodiments of the present disclosure, division into the modules is an example and is merely logical function division. During actual implementation, another division manner may be used.

Figure 20:
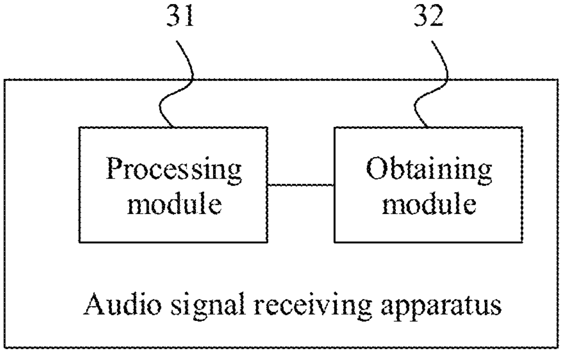
FIG. 20 is a schematic structural diagram of an audio processing apparatus according to an embodiment of the present disclosure.

FIG. 20 is a schematic structural diagram of an audio processing apparatus according to an embodiment of the present disclosure. Referring to FIG. 20, the apparatus in this embodiment includes a processing module 31 and an obtaining module 32.

The processing module 31 is configured to obtain M first audio signals by processing a to-be-processed audio signal by M first virtual speakers, and N second audio signals by processing the to-be-processed audio signal by N second virtual speakers, where the M first virtual speakers are in a one-to-one correspondence with the M first audio signals, the N second virtual speakers are in a one-to-one correspondence with the N second audio signals, and M and N are positive integers.

The obtaining module 32 is configured to obtain M first HRTFs and N second HRTFs, where all the M first HRTFs are centered at a left ear position, all the N second HRTFs are centered at a right ear position, the M first HRTFs are in a one-to-one correspondence with the M first virtual speakers, and the N second HRTFs are in a one-to-one correspondence with the N second virtual speakers.

The obtaining module 32 is further configured to: obtain a first target audio signal based on the M first audio signals and the M first HRTFs, and obtain a second target audio signal based on the N second audio signals and the N second HRTFs.

The apparatus in this embodiment may be configured to perform the technical solutions of the foregoing method embodiments. Implementation principles and technical effects of the apparatus are similar to those of the foregoing method embodiments. Details are not described herein again.

In a possible design, the obtaining module 32 is configured to: convolve each of the M first audio signals with a corresponding first HRTF, to obtain M first convolved audio signals; and obtain the first target audio signal based on the M first convolved audio signals.

In a possible design, the obtaining module 32 is configured to: convolve each of the N second audio signals with a corresponding second HRTF, to obtain N second convolved audio signals; and obtain the second target audio signal based on the N second convolved audio signals.

In a possible design, correspondences between a plurality of preset positions and a plurality of HRTFs are prestored, and the obtaining module 32 is configured to: obtain M first positions of the M first virtual speakers relative to the current left ear position; and determine, based on the M first positions and the correspondences, that M HRTFs corresponding to the M first positions are the M first HRTFs.

In a possible design, correspondences between a plurality of preset positions and a plurality of HRTFs are prestored, and the obtaining module 32 is configured to: obtain N second positions of the N second virtual speakers relative to the current right ear position; and determine, based on the N second positions and the correspondences, that N HRTFs corresponding to the N second positions are the N second HRTFs.

In a possible design, correspondences between a plurality of preset positions and a plurality of HRTFs are prestored, and the obtaining module 32 is configured to: obtain M third positions of the M first virtual speakers relative to a current head center, where the third position includes a first azimuth and a first elevation of the first virtual speaker relative to the current head center, and includes a first distance between the current head center and the first virtual speaker; determine M fourth positions based on the M third positions, where the M third positions are in a one-to-one correspondence with the M fourth positions, one fourth position and a corresponding third position include a same elevation and a same distance, and a difference between an azimuth included in the one fourth position and a first value is a first azimuth included in the corresponding third position, where the first value is a difference between a first included angle and a second included angle, the first included angle is an included angle between a first straight line and a first plane, the second included angle is an included angle between a second straight line and the first plane, the first straight line is a straight line that passes through the current left ear and a coordinate origin of a three-dimensional coordinate system, the second straight line is a straight line that passes through the current head center and the coordinate origin, and the first plane is a plane constituted by an X axis and a Z axis of the three-dimensional coordinate system; and determine, based on the M fourth positions and the correspondences, that M HRTFs corresponding to the M fourth positions are the M first HRTFs.

In a possible design, correspondences between a plurality of preset positions and a plurality of HRTFs are prestored, and the obtaining module 32 is configured to: obtain N fifth positions of the N second virtual speakers relative to the current head center, where the fifth position includes a second azimuth and a second elevation of the second virtual speaker relative to the current head center, and includes a second distance between the current head center and the second virtual speaker; determine N sixth positions based on the N fifth positions, where the N fifth positions are in a one-to-one correspondence with the N sixth positions, one sixth position and a corresponding fifth position include a same elevation and a same distance, and a sum of an azimuth included in the one sixth position and a second value is a second azimuth included in the corresponding fifth position, where the second value is a difference between a third included angle and a second included angle, the second included angle is an included angle between a second straight line and a first plane, the third included angle is an included angle between a third straight line and the first plane, the second straight line is the straight line that passes through the current head center and the coordinate origin, the third straight line is a straight line that passes through the current right ear and the coordinate origin, and the first plane is the plane constituted by the X axis and the Z axis of the three-dimensional coordinate system; and determine, based on the N sixth positions and the correspondences, that N HRTFs corresponding to the N sixth positions are the N second HRTFs.

In a possible design, correspondences between a plurality of preset positions and a plurality of HRTFs are prestored, and the obtaining module 32 is configured to: obtain M third positions of the M first virtual speakers relative to a current head center, where the third position includes a first azimuth and a first elevation of the first virtual speaker relative to the current head center, and includes a first distance between the current head center and the first virtual speaker; determine M seventh positions based on the M third positions, where the M third positions are in a one-to-one correspondence with the M seventh positions, one seventh position and a corresponding third position include a same elevation and a same distance, and a difference between an azimuth included in the one seventh position and a first preset value is a first azimuth included in the corresponding third position; and determine, based on the M seventh positions and the correspondences, that M HRTFs corresponding to the M seventh positions are the M first HRTFs.

In a possible design, correspondences between a plurality of preset positions and a plurality of HRTFs are prestored, and the obtaining module 32 is configured to: obtain N fifth positions of the N second virtual speakers relative to the current head center, where the fifth position includes a second azimuth and a second elevation of the second virtual speaker relative to the current head center, and includes a second distance between the current head center and the second virtual speaker; determine N eighth positions based on the N fifth positions, where the N fifth positions are in a one-to-one correspondence with the N eighth positions, one eighth position and a corresponding fifth position include a same elevation and a same distance, and a sum of an azimuth included in the one eighth position and the first preset value is a second azimuth included in the corresponding fifth position; and determine, based on the N eighth positions and the correspondences, that N HRTFs corresponding to the N eighth positions are the N second HRTFs.

In a possible design, before the M first audio signals are obtained by processing the to-be-processed audio signal by the M first virtual speakers, the obtaining module 32 is further configured to: obtain a target virtual speaker group, where the target virtual speaker group includes M target virtual speakers, and the M target virtual speakers are in a one-to-one correspondence with the M first virtual speakers; and determine M tenth positions of the M first virtual speakers relative to the coordinate origin of the three-dimensional coordinate system based on M ninth positions of the M target virtual speakers relative to the coordinate origin, where the M ninth positions are in a one-to-one correspondence with the M tenth positions, one tenth position and a corresponding ninth position include a same elevation and a same distance, and a difference between an azimuth included in the one tenth position and a second preset value is an azimuth included in the corresponding ninth position.

The processing module 32 is configured to process the to-be-processed audio signal based on the M tenth positions, to obtain the M first audio signals.

In a possible design, M=N, and before the N second audio signals are obtained by processing the to-be-processed audio signal by the N second virtual speakers, the obtaining module 32 is further configured to: obtain a target virtual speaker group, where the target virtual speaker group includes M target virtual speakers, and the M target virtual speakers are in a one-to-one correspondence with the N second virtual speakers; and determine N eleventh positions of the N second virtual speakers relative to the coordinate origin of the three-dimensional coordinate system based on the M ninth positions of the M target virtual speakers relative to the coordinate origin, where the M ninth positions are in a one-to-one correspondence with the N eleventh positions, one eleventh position and a corresponding ninth position include a same elevation and a same distance, and a sum of an azimuth included in the one eleventh position and a second preset value is an azimuth included in the corresponding ninth position.

The processing module 32 is configured to process the to-be-processed audio signal based on the N eleventh positions, to obtain the N second audio signals.

In a possible design, the M first virtual speakers are speakers in a first speaker group, the N second virtual speakers are speakers in a second speaker group, and the first speaker group and the second speaker group are two independent speaker groups; or the M first virtual speakers are speakers in a first speaker group, the N second virtual speakers are speakers in a second speaker group, and the first speaker group and the second speaker group are a same speaker group, where M=N.

The apparatus in this embodiment may be configured to perform the technical solutions of the foregoing method embodiments. Implementation principles and technical effects of the apparatus are similar to those of the foregoing method embodiments. Details are not described herein again.

An embodiment of the present disclosure provides a computer-readable storage medium. The computer-readable storage medium stores an instruction, and when the instruction is executed, a computer is enabled to perform the method in the foregoing method embodiment of the present disclosure.

In the several embodiments provided in the present disclosure, it should be understood that the disclosed apparatus and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of hardware combined with a software functional unit.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An audio processing method comprising:

receiving a bitstream;

decoding the bitstream to obtain a to-be-processed audio signal, wherein the to-be-processed audio signal is an Ambisonics signal;

processing, by M first virtual speakers, the to-be-processed audio signal to obtain M first audio signals, wherein the M first virtual speakers are in a one-to-one correspondence with the M first audio signals, and wherein M is a first positive integer;

obtaining M first head-related transfer functions (HRTFs), wherein the M first HRTFs are centered at a left ear position, and wherein the M first HRTFs are in a one-to-one correspondence with the M first virtual speakers; and obtaining a first target audio signal based on the M first audio signals and the M first HRTFs.

2. The audio processing method of claim 1, wherein obtaining the first target audio signal based on the M first audio signals and the M first HRTFs comprises:

convolving each of the M first audio signals with a corresponding first HRTF to obtain M first convolved audio signals; and obtaining the first target audio signal based on the M first convolved audio signals.

3. The audio processing method of claim 1, further comprising storing correspondences between a plurality of preset positions and a plurality of HRTFs, wherein obtaining the M first HRTFs comprises:

obtaining M first positions of the M first virtual speakers relative to a current left ear position; and determining, based on the M first positions and the correspondences, that the M first HRTFs correspond to the M first positions.

4. The audio processing method of claim 1, further comprising storing correspondences between a plurality of preset positions and a plurality of HRTFs, wherein obtaining the M first HRTFs comprises:

obtaining M third positions of the M first virtual speakers relative to a current head center, wherein each of the M third positions comprises a first azimuth and a first elevation of a first virtual speaker relative to the current head center, and wherein each of the M third positions further comprises a first distance between the current head center and the first virtual speaker;

determining M fourth positions based on the M third positions, wherein the M third positions are in a one-to-one correspondence with the M fourth positions, wherein each of the M fourth positions and a corresponding M third position comprise a same elevation and a same distance, wherein a difference between an azimuth in each of the M fourth positions and a first value is the first azimuth in the corresponding M third position, wherein the first value is a difference between a first included angle and a second included angle, wherein the first included angle is between a first straight line and a first plane, wherein the second included angle is between a second straight line and the first plane, wherein the first straight line passes through a current left ear position and a coordinate origin of a three-dimensional coordinate system, wherein the second straight line passes through the current head center and the coordinate origin, and wherein the first plane is defined by an X axis and a Z axis of the three-dimensional coordinate system; and determining, based on each of the M fourth positions and the correspondences, that the M first HRTFs correspond to the M fourth positions.

5. The audio processing method of claim 1, further comprising storing correspondences between a plurality of preset positions and a plurality of HRTFs, wherein obtaining the M first HRTFs comprises:

obtaining M third positions of the M first virtual speakers relative to a current head center, wherein each of the M third positions comprises a first azimuth and a first elevation of a first virtual speaker relative to the current head center, and wherein each of the M third positions further comprises a first distance between the current head center and the first virtual speaker;

determining M seventh positions based on the M third positions, wherein the M third positions are in a one-to-one correspondence with the M seventh positions, wherein each of the M seventh positions and a corresponding M third position comprise a same elevation and a same distance, and wherein a difference between an azimuth in each of the M seventh positions and a first preset value is the first azimuth in the corresponding M third position; and determining, based on the M seventh positions and the correspondences, that the M first HRTFs correspond to the M seventh positions.

6. The audio processing method of claim 1, wherein prior to obtaining the M first audio signals, the audio processing method further comprises:

obtaining a target virtual speaker group, wherein the target virtual speaker group comprises M target virtual speakers, and wherein the M target virtual speakers are in a one-to-one correspondence with the M first virtual speakers; and determining M tenth positions of the M first virtual speakers relative to a coordinate origin of a three-dimensional coordinate system based on M ninth positions of the M target virtual speakers relative to the coordinate origin, wherein the M ninth positions are in a one-to-one correspondence with the M tenth positions, wherein each of the M tenth positions and a corresponding M ninth position comprise a same elevation and a same distance, and wherein a difference between a first azimuth in each of the M tenth positions and a second preset value is a second azimuth in the corresponding M ninth position, and wherein obtaining the M first audio signals comprises processing the to-be-processed audio signal based on the M tenth positions to obtain the M first audio signals.

7. An audio processing apparatus comprising:

one or more processor; and a memory configured to store computer executable instructions, wherein the computer executable instructions when executed by the one or more processors cause the audio processing apparatus to:

receive a bitstream;

decode the bitstream to obtain a to-be-processed audio signal, wherein the to-be-processed audio signal is an Ambisonics signal;

process, by M first virtual speakers, a to-be-processed audio signal to obtain M first audio signals, wherein the M first virtual speakers are in a one-to-one correspondence with the M first audio signals;

obtain M first head-related transfer functions (HRTFs), wherein the M first HRTFs are centered at a left ear position, and wherein the M first HRTFs are in a one-to-one correspondence with the M first virtual speakers; and obtain a first target audio signal based on the M first audio signals and the M first HRTFs.

8. The audio processing apparatus of claim 7, wherein execution of the computer executable instructions further causes the audio processing apparatus to:

convolve each of the M first audio signals with a corresponding first HRTF to obtain M first convolved audio signals; and obtain the first target audio signal based on the M first convolved audio signals.

9. The audio processing apparatus of claim 7, wherein execution of the computer executable instructions further causes the audio processing apparatus to:

store correspondences between a plurality of preset positions and a plurality of HRTFs;

obtain M first positions of the M first virtual speakers relative to a current left ear position; and determine, based on the M first positions and correspondences, that the M first HRTFs correspond to the M first positions.

10. The audio processing apparatus of claim 7, wherein execution of the computer executable instructions further causes the audio processing apparatus to:

store correspondences between a plurality of preset positions and a plurality of HRTFs;

obtain M third positions of the M first virtual speakers relative to a current head center, wherein each of the M third positions comprises a first azimuth and a first elevation of a first virtual speaker relative to the current head center, and wherein each of the M third positions further comprises a first distance between the current head center and the first virtual speaker;

determine M fourth positions based on the M third positions, wherein the M third positions are in a one-to-one correspondence with the M fourth positions, wherein each of the M fourth positions and a corresponding M third position comprise a same elevation and a same distance, wherein a difference between an azimuth in each of the M fourth positions and a first value is the first azimuth in the corresponding M third position, wherein the first value is a difference between a first included angle and a second included angle, wherein the first included angle is between a first straight line and a first plane, wherein the second included angle is between a second straight line and the first plane, wherein the first straight line passes through a current left ear position and a coordinate origin of a three-dimensional coordinate system, wherein the second straight line passes through the current head center and the coordinate origin, and wherein the first plane is defined by an X axis and a Z axis of the three-dimensional coordinate system; and determine, based on the M fourth positions and correspondences, that the M first HRTFs correspond to the M fourth positions.

11. The audio processing apparatus of claim 7, wherein execution of the computer executable instructions further causes the audio processing apparatus to:

store correspondences between a plurality of preset positions and a plurality of HRTFs;

obtain M third positions of the M first virtual speakers relative to a current head center, wherein each of the M third positions comprises a first azimuth and a first elevation of a first virtual speaker relative to the current head center, and wherein each of the M third positions comprises a first distance between the current head center and the first virtual speaker;

determine M seventh positions based on the M third positions, wherein the M third positions are in a one-to-one correspondence with the M seventh positions, wherein each of the M seventh positions and a corresponding M third position comprise a same elevation and a same distance, and wherein a difference between an azimuth in each of the M seventh position and a first preset value is the first azimuth in the corresponding M third position; and determine, based on the M seventh positions and correspondences, that the M first HRTFs correspond to the M seventh positions.

12. The audio processing apparatus of claim 7, wherein execution of the computer executable instructions further causes the audio processing apparatus to:

obtain a target virtual speaker group, wherein the target virtual speaker group comprises M target virtual speakers, and wherein the M target virtual speakers are in a one-to-one correspondence with the M first virtual speakers; and determine M tenth positions of the M first virtual speakers relative to a coordinate origin of a three-dimensional coordinate system based on M ninth positions of the M target virtual speakers relative to the coordinate origin, wherein the M ninth positions are in a one-to-one correspondence with the M tenth positions, wherein each of the M tenth positions and a corresponding M ninth position comprise a same elevation and a same distance, and wherein a difference between a first azimuth in each of the M tenth positions and a second preset value is a second azimuth in the corresponding M ninth position, and wherein the at least one processor is configured to obtain the M first audio signals by processing the to-be-processed audio signal based on the M tenth positions.

13. A non-transitory computer-readable storage medium storing computer instructions, that when executed by one or more processors of a system, cause the system to:

receive a bitstream;

decode the bitstream to obtain a to-be-processed audio signal, wherein the to-be-processed audio signal is an Ambisonics signal;

process a to-be-processed audio signal by M first virtual speakers to obtain M first audio signals, wherein the M first virtual speakers are in a one-to-one correspondence with the M first audio signals;

obtain M first head-related transfer functions (HRTFs), wherein the M first HRTFs are centered at a left ear position, and wherein the M first HRTFs are in a one-to-one correspondence with the M first virtual speakers; and obtain a first target audio signal based on the M first audio signals and the M first HRTFs.

14. The non-transitory computer-readable storage medium of claim 13, wherein the computer instructions, when executed by the one or more processors of the system, further cause the system to:

convolve each of the M first audio signals with a corresponding first HRTF to obtain M first convolved audio signals; and obtain the first target audio signal based on the M first convolved audio signals.

15. The non-transitory computer-readable storage medium of claim 13, wherein the computer instructions, when executed by the one or more processors of the system, further cause the system to:

obtain M first positions of the M first virtual speakers relative to a current left ear position; and determine, based on the M first positions and correspondences between a plurality of preset positions and a plurality of HRTFs, that the M first HRTFs correspond to the M first positions.

16. The non-transitory computer-readable storage medium of claim 13, wherein the computer instructions, when executed by the one or more processors of the system, further cause the system to:

obtain M third positions of the M first virtual speakers relative to a current head center, wherein each of the M third positions comprises a first azimuth and a first elevation of a first virtual speaker relative to the current head center, and wherein each of the M third positions further comprises a first distance between the current head center and the first virtual speaker;

determine M fourth positions based on the M third positions, wherein the M third positions are in a one-to-one correspondence with the M fourth positions, wherein each of the M fourth positions and a corresponding M third position comprise a same elevation and a same distance, wherein a difference between an azimuth in each of the M fourth positions and a first value is a first azimuth in the corresponding M third position, wherein the first value is a difference between a first included angle and a second included angle, wherein the first included angle is between a first straight line and a first plane, wherein the second included angle is between a second straight line and the first plane, wherein the first straight line passes through a current left ear position and a coordinate origin of a three-dimensional coordinate system, wherein the second straight line passes through the current head center and the coordinate origin, and wherein the first plane is defined by an X axis and a Z axis of the three-dimensional coordinate system; and determine, based on the M fourth positions and correspondences between a plurality of preset positions and a plurality of HRTFs, that the M first HRTFs correspond to the M fourth positions.

17. The non-transitory computer-readable storage medium of claim 13, wherein the computer instructions, when executed by the one or more processors of the system, further cause the system to:

obtain M third positions of the M first virtual speakers relative to a current head center, wherein each of the M third positions comprises a first azimuth and a first elevation of a first virtual speaker relative to the current head center, and wherein each of the M fourth positions further comprises a first distance between the current head center and the first virtual speaker;

determine M seventh positions based on the M third positions, wherein the M third positions are in a one-to-one correspondence with the M seventh positions, each of the M seventh positions and a corresponding M third position comprise a same elevation and a same distance, and a difference between an azimuth in each of the M seventh positions and a first preset value is the first azimuth in the corresponding M third position; and determining, based on the M seventh positions and correspondences between a plurality of preset positions and a plurality of HRTFs, that the M first HRTFs correspond to the M seventh positions.

18. The non-transitory computer-readable storage medium of claim 13, wherein the computer instructions, when executed by the one or more processors of the system, further cause the system to:

obtain a target virtual speaker group, wherein the target virtual speaker group comprises M target virtual speakers, and wherein the M target virtual speakers are in a one-to-one correspondence with the M first virtual speakers; and determine M tenth positions of the M first virtual speakers relative to a coordinate origin of a three-dimensional coordinate system based on M ninth positions of the M target virtual speakers relative to the coordinate origin, wherein the M ninth positions are in a one-to-one correspondence with the M tenth positions, wherein each of the M tenth positions and a corresponding M ninth position comprise a same elevation and a same distance, and wherein a difference between an azimuth in each of the M tenth positions and a second preset value is the azimuth in the corresponding M ninth position, and wherein the one or more processors are configured to obtain the M first audio signals by processing the to-be-processed audio signal based on the M tenth positions.

19. The audio processing method of claim 1, further comprising:

processing, by N second virtual speakers, the to-be-processed audio signal to obtain N second audio signals, wherein the N second virtual speakers are in a one-to-one correspondence with the N second audio signals, and wherein N is a second positive integer;

obtaining N second HRTFs centered at a right ear position;

obtaining a second target audio signal based on the N second audio signals and the N second HRTFs;

transmitting the first target audio signal to a left ear; and transmitting the second target audio signal to a right ear.

20. The audio processing apparatus of claim 7, wherein execution of the computer executable instructions further causes the audio processing apparatus to:

process, by N second virtual speakers, the to-be-processed audio signal to obtain N second audio signals, wherein the N second virtual speakers are in a one-to-one correspondence with the N second audio signals, and wherein N is a second positive integer;

obtain N second HRTFs centered at a right ear position;

obtain a second target audio signal based on the N second audio signals and the N second HRTFs;

transmitting the first target audio signal to a left ear; and transmitting the second target audio signal to a right ear.

* * * * *